(12) United States Patent
Mondal et al.

(10) Patent No.: US 12,494,052 B2
(45) Date of Patent: Dec. 9, 2025

(54) SYSTEM AND METHOD FOR DETERMINING INCOMING OBSERVATION TO BE OUT-OF-DISTRIBUTION (OOD) SAMPLE DURING NEURAL NETWORK (NN) INFERENCE

(71) Applicant: Rockwell Collins, Inc., Cedar Rapids, IA (US)

(72) Inventors: Sudeepta Mondal, Bristol, CT (US); Ganesh Sundaramoorthi, Duluth, GA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 304 days.

(21) Appl. No.: 18/238,180

(22) Filed: Aug. 25, 2023

(65) Prior Publication Data

US 2025/0069381 A1 Feb. 27, 2025

(51) Int. Cl.
*G06V 10/82* (2022.01)
*G06V 10/72* (2022.01)
*G06V 10/764* (2022.01)

(52) U.S. Cl.
CPC .............. *G06V 10/82* (2022.01); *G06V 10/72* (2022.01); *G06V 10/764* (2022.01)

(58) Field of Classification Search
CPC ....... G06V 10/82; G06V 10/72; G06V 10/764
See application file for complete search history.

(56) References Cited

U.S. PATENT DOCUMENTS 7,405,694 B1 7/2008 Hwang et al.
7,679,554 B1 3/2010 Hwang et al.
(Continued)

FOREIGN PATENT DOCUMENTS

CN 114897134 A 8/2022
GB 2604263 A 8/2022
(Continued)

OTHER PUBLICATIONS

Lee, Kimin, et al. "A simple unified framework for detecting out-of-distribution samples and adversarial attacks." Advances in neural information processing systems 31 (2018). (Year: 2018).*
(Continued)

*Primary Examiner* — Utpal D Shah
(74) *Attorney, Agent, or Firm* — Suiter Swantz IP

(57) ABSTRACT

A system may include at least one processor configured to: obtain a trained neural network (NN); obtain or calculate at least one average feature information associated with the trained NN, each of the at least one average feature information including a given average feature information summarizing in-class statistics that each layer of the trained NN uses for a given class; receive an incoming observation influencing a given layer; calculate a corresponding feature information of the incoming observation, the corresponding feature information summarizing statistics of the incoming observation for the given layer; classify the incoming observation as being in the given class; calculate a distance score associated with a distance between the corresponding feature information of the incoming observation and the given average feature information; determine the incoming observation is an out-of-distribution (OOD) sample; and output an alert indicating the incoming observation is OOD and/or discard the incoming observation's classification.

15 Claims, 22 Drawing Sheets

(56) References Cited

U.S. PATENT DOCUMENTS

| | | | |
|---|---|---|---|
| 10,424,087 B2* | 9/2019 | Risser | G06T 11/00 |
| 11,501,152 B2 | 11/2022 | Rohekar et al. | |
| 2019/0122073 A1 | 4/2019 | Ozdemir et al. | |
| 2020/0065648 A1 | 2/2020 | Hwang et al. | |
| 2021/0073631 A1 | 3/2021 | Viswanathan et al. | |
| 2021/0350236 A1 | 11/2021 | Severa et al. | |
| 2021/0365771 A1 | 11/2021 | Speakman et al. | |
| 2021/0374524 A1 | 12/2021 | Feng et al. | |
| 2022/0111874 A1* | 4/2022 | Stimpson | G06V 10/454 |
| 2022/0180154 A1 | 6/2022 | Martinez | |
| 2022/0318557 A1* | 10/2022 | Mohseni | G06V 20/56 |
| 2023/0072878 A1 | 3/2023 | Han et al. | |
| 2023/0230228 A1* | 7/2023 | Liu | G06V 10/761 |
| 2024/0135150 A1* | 4/2024 | Sundaramoorthi | G06N 5/045 |

FOREIGN PATENT DOCUMENTS

| | | |
|---|---|---|
| WO | 2019229733 A1 | 12/2019 |
| WO | 2022115676 A3 | 7/2022 |
| WO | 2022216506 A1 | 10/2022 |

OTHER PUBLICATIONS

Dong et al., "Lightweight Detection of Out-of-Distribution and Adversarial Samples via Channel Mean Discrepancy," arxiv.org, Cornell University Library, Apr. 23, 2021, 12 pages.

European Patent Office, Extended European Search Report received in EP Application No. 24196017.8, Feb. 12, 2025, 10 pages.

Olber et al., "Detection of Out-of-Distribution Samples Using Binary Neuron Activation Patterns," 2023 IEEE/CVF Conference on Computer Vision and Pattern Recognition (CVPR), IEEE, Jun. 17, 2023, 10 pages.

A. Malinin and M. Gales, "Predictive uncertainty estimation via prior networks," in Advances in Neural Information Processing Systems, 2018, pp. 7047-7058.

D. Barber and C. M. Bishop, "Ensemble learning in bayesian neural networks," Nato ASI Series F Computer and Systems Sciences, vol. 168, pp. 215-237, 1998.

G. E. Hinton and D. Van Camp, "Keeping the neural networks simple by minimizing the description length of the weights," in Proceedings of the sixth annual conference on Computational learning theory, 1993, pp. 5-1.

G. Wang, W. Li, S. Ourselin, and T. Vercauteren, "Automatic brain tumor segmentation using convolutional neural networks with testtime augmentation," in International MICCAI Brainlesion Workshop. Springer, 2018, pp. 61-72.

M. Sensoy, L. Kaplan, and M. Kandemir, "Evidential deep learning to quantify classification uncertainty," in Advances in Neural Information Processing Systems, 2018, pp. 3179-3189.

Richard Sjogren, et al. "Out-Of-Distribution Example Detection in Deep Neural Networks Using Distance to Modelled Embedding", publication date unknown.

T. Kurutach, I. Clavera, Y. Duan, A. Tamar, and P. Abbeel, "Model ensemble trust-region policy optimization," in International Conference on Learning Representations, 2018.

T. Lacombe, Y. Ike et al., "Topological uncertainty", ArXiv:2105.04404, 2021.

Y. Cao, T. A. Geddes, J. Y. H. Yang, and P. Yang, "Ensemble deep learning in bioinformatics," Nature Machine Intelligence, pp. 1-9, 2020.

Y. Sun, C. Guo. Y. Li "ReAct: Out-of-distribution Detection With Rectified Activations", Advances in Neural Information Processing Systems, 2021.

* cited by examiner

| Layer (type) | Output Shape | Param # |
|---|---|---|
| conv2d (Conv2D) | (None, 26, 26, 32) | 320 |
| max_pooling2d (MaxPooling2D) | (None, 13, 13, 32) | 0 |
| conv2d_1 (Conv2D) | (None, 11, 11, 15) | 4335 |
| max_pooling2d (MaxPooling2D) | (None, 5, 5, 15) | 0 |
| conv2d_2 (Conv2D) | (None, 3, 3, 5) | 680 |
| flatten (Flatten) | (None, 45) | 0 |
| dense (Dense) | (None, 20) | 920 |
| dense_1 (Dense) | (None, 10) | 210 |

Total params: 6,465
Trainable params: 6,465
Non-trainable params: 0

FIG. 7A

SYSTEM AND METHOD FOR DETERMINING INCOMING OBSERVATION TO BE OUT-OF-DISTRIBUTION (OOD) SAMPLE DURING NEURAL NETWORK (NN) INFERENCE

BACKGROUND

Currently, data drift is a practical problem which affects the performance of deep neural networks (DNNs) in practice for automatic target recognition (ATR) tasks. Topology-augmented metrics have been found to be a promising way of quantifying if a trained neural network (NN) can be trusted in application. Currently, topological descriptors can robustly monitor the performance of a trained neural network (NN) in the face of out-of-distribution (OOD) data. However, such current approaches scale poorly to large neural networks (CNNs) commonly used in ATR applications.

Some fielded systems are required to have accurate neural network (NN) uncertainty estimation prior to integration into the fielded systems. Many real-world applications, such as ATR, of DNNs, such as CNNs, use millions of parameters.

One exemplary application area is for synthetic aperture radar (SAR)-based ATR used on military vehicles with DNNs. Deploying such an application in practice requires out-of-distribution (OOD) detection capabilities to determine when the ATR output is unreliable. Further, other exemplary target recognition applications may involve detection of maritime objects (e.g., ships), missile detection, biometric detection of people from unmanned aerial vehicles (UAVs) under different environmental conditions. Currently, a vast majority of these applications involve computer vision tasks which use DNNs, such as CNNs. It is important to understand how these networks will behave in practice in the face of shifts in real world data distributions to detect when a classification of an incoming observation is OOD.

DNNs are trained on training data (also referred to as a training set) with certain statistical properties. Statistics for real-world data often drifts away from the training set. Deep learning models can thus fail in the real-world, such as due to a lack of generalization. There is a need for a system performing inference operations on test data using a trained NN to be able to recognize when a learning model has failed and use another system. Currently, there are problems associated with determining whether data has drifted in a way that a DNN prediction is unreliable and associated with how to adapt a learning model once data drift has been determined.

SUMMARY

In one aspect, embodiments of the inventive concepts disclosed herein are directed to a system. The system may include at least one processor configured to: obtain a trained neural network (NN) having classes, layers, and activation weights for the classes and layers, the classes including a given class, the layers including a given layer; obtain or calculate at least one average feature information associated with the trained NN, each of the at least one average feature information including a given average feature information summarizing in-class statistics that each layer of the layers of the trained NN uses for the given class; receive an incoming observation influencing the given layer; calculate a corresponding feature information of the incoming observation, the corresponding feature information summarizing statistics of the incoming observation for the given layer; based at least on the trained NN, classify the incoming observation as being in the given class; for the incoming observation classified to be in the given class, calculate a distance score associated with a distance between the corresponding feature information of the incoming observation and the given average feature information; based at least on the calculated distance score, determine that the incoming observation is an out-of-distribution (OOD) sample; and upon a determination that the incoming observation is the OOD sample, at least one of output an alert indicating that the incoming observation is OOD or discard the classification of the incoming observation as being in the given class.

In a further aspect, embodiments of the inventive concepts disclosed herein are directed to a method. The method may include: obtaining, by at least one processor, a trained neural network (NN) having classes, layers, and activation weights for the classes and layers, the classes including a given class, the layers including a given layer; obtaining or calculating, by the at least one processor, at least one average feature information associated with the trained NN, each of the at least one average feature information including a given average feature information summarizing in-class statistics that each layer of the layers of the trained NN uses for the given class; receiving, by the at least one processor, an incoming observation influencing the given layer; calculating, by the at least one processor, a corresponding feature information of the incoming observation, the corresponding feature information summarizing statistics of the incoming observation for the given layer; based at least on the trained NN, classifying, by the at least one processor, the incoming observation as being in the given class; for the incoming observation classified to be in the given class, calculating, by the at least one processor, a distance score associated with a distance between the corresponding feature information of the incoming observation and the given average feature information; based at least on the calculated distance score, determining, by the at least one processor, that the incoming observation is an out-of-distribution (OOD) sample; and upon a determination that the incoming observation is the OOD sample, at least one of: outputting, by the at least one processor, an alert indicating that the incoming observation is OOD; or discarding, by the at least one processor, the classification of the incoming observation as being in the given class.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7A shows an exemplary CNN model architecture with an activation graph associated with a layer for histogram computation according to the inventive concepts disclosed herein.

DETAILED DESCRIPTION

Figure 1:
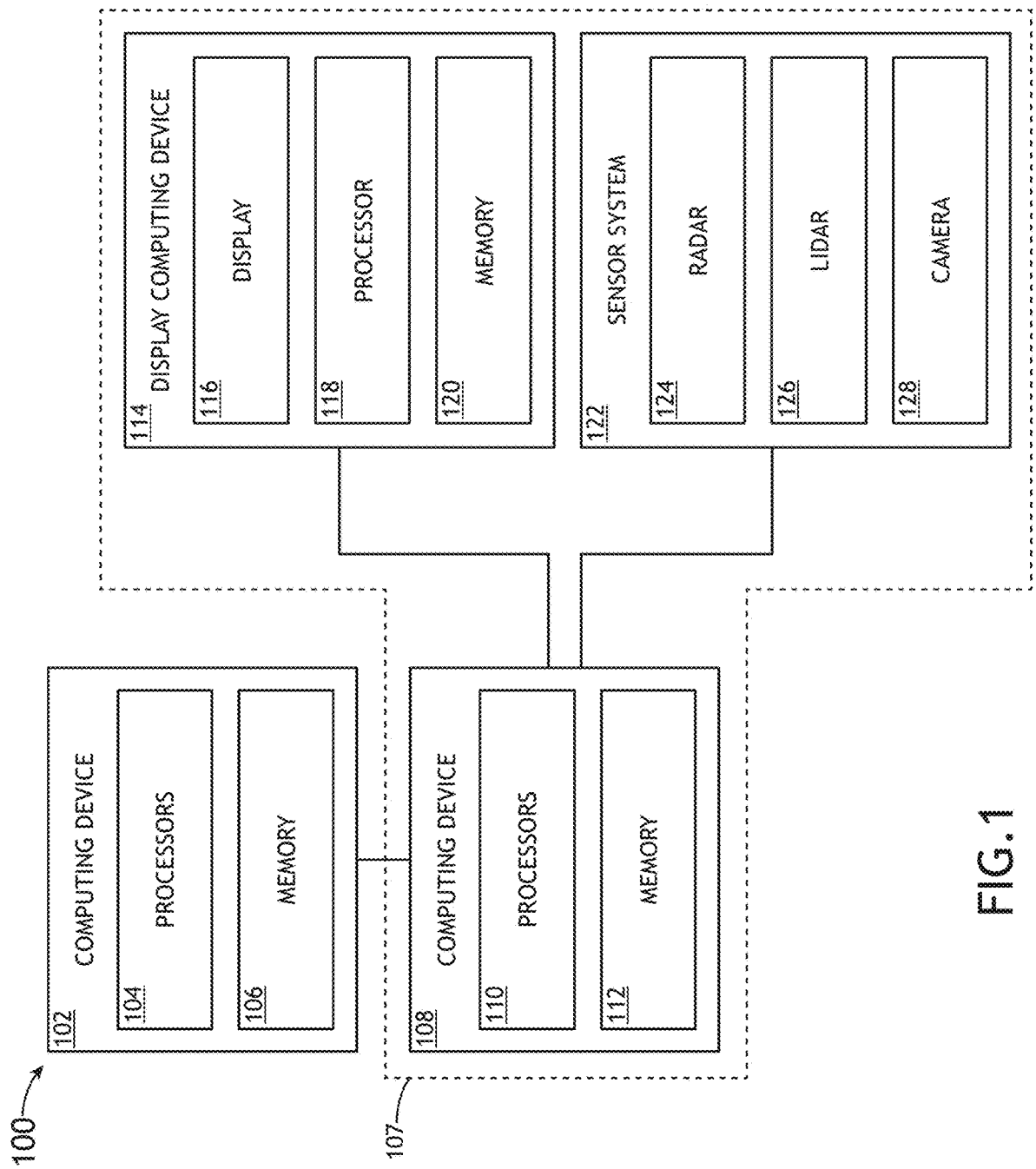
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a system and a method configured to determine an incoming observation to be an OOD sample during NN (e.g., DNN and/or CNN) inference.

Embodiments may improve the functioning of a computing device, itself, such as by improving an efficiency, improving a speed, and/or reducing power consumed to detect an OOD sample.

Some embodiments may be used for determine an incoming observation to be an OOD sample during NN (e.g., DNN and/or CNN) inference used for ATR, self-driving cars, safety critical artificial intelligence (AI), ethical AI, behavioral analysis (e.g., for cyber activities), automated landing systems, collision avoidance, edge-based neural networks, or any other suitable application.

In some embodiments, by using a trained neural network (NN), an activation graph of a particular layer may be computed, which relates how the trained NN reacts to incoming data (e.g., test data, such as an incoming observation). Persistence diagrams may be calculated for that activation graph and may be used for tracking how the activation graph changes under shifts in data distributions. Persistence diagrams have stability guarantees as out-of-distribution (OOD) detectors. However, the OOD detection computation does not currently scale well to larger activation graphs, as currently used by state of the art (SoA) automatic target recognition (ATR) frameworks based on convolutional neural network (CNN) architectures. Some embodiments make the topological approaches fast and scalable by downsampling the activation graphs, which makes it feasible to use such approaches for real-time monitoring of deep neural network (DNN)-based ATR frameworks, such as CNN-based ATR frameworks. Some embodiments make it possible to deploy topological approaches in practice for monitoring how large computer-vision networks generalize in practice. Compared to current baseline topological approaches, some embodiments may provide around 30× (30 times) or more speed-up in training time, and/or 10× (ten times) or more speed-up in testing time for moderately sized activation graphs, with comparable OOD detection performance. Even higher speed-ups are expected for applications involving larger activation graphs as used by larger neural network models.

Referring now to FIG. 1, an exemplary embodiment of a system 100 according to the inventive concepts disclosed herein is depicted. In some embodiments, the system 100 may include a vehicle 107 (e.g., an aircraft (e.g., a piloted, remote piloted, and/or uncrewed aerial vehicle (UAV)), an automobile, a train, a submersible craft, a spacecraft, and/or a watercraft). The system 100 may include at least one computing device 102, at least one computing device 108, at least one display computing device 114, at least one sensor system 122, and/or the aircraft 107, some or all of which may be communicatively coupled at any given time. In some embodiments, some or all of the at least one computing device 102, the at least one computing device 108, the at least one display computing device 114, and/or the at least one sensor system 122 may be installed onboard and/or offboard of the vehicle 107. While the system 100 exemplarily includes the vehicle 107, in some embodiments, a system configured to determine an incoming observation to be an OOD sample during NN inference may be implemented in any suitable environment, and such system may be installed at a mobile or fixed location other than the vehicle 107; for example, some or all of the at least one computing device 102, the at least one computing device 108, the at least one display computing device 114, and/or the at least one sensor system 122 may be installed in and/or on a wearable device (e.g., a head wearable display device or a smart watch), a manpack, a server computing device (e.g., an edge computing server), a mobile computing device (e.g., a mobile phone, a tablet computing device, or a laptop computing device), a personal computing device, and/or a computer-vision system.

In some embodiments, any or all of the computing device 102, the computing device 108, the display computing device 114, and/or the sensor system 122 may be installed onboard the vehicle 107. In other embodiments, some or all of the computing device 102, the computing device 108, the display computing device 114, and/or the sensor system 122 may be installed onboard the vehicle 107 may be installed off-board of the vehicle. In other embodiments, some or all of the computing device 102, the computing device 108, the display computing device 114, and/or the sensor system 122 may be installed onboard the vehicle 107 may be redundantly installed onboard and off-board of the vehicle 107.

The at least one computing device 102 may be implemented as any suitable computing device, such as a personal computer(s) and/or server(s). The at least one computing device 102 may include any or all of the elements, as shown in FIG. 1. For example, the computing device 102 may include at least one processor 104, at least one memory 106, and/or at least one storage, some or all of which may be communicatively coupled at any given time. For example, the at least one processor 104 may include at least one central processing unit (CPU), at least one graphics processing unit (GPU), at least one field-programmable gate array (FPGA), at least one application specific integrated circuit (ASIC), at least one digital signal processor, at least one data processing unit (DPU), at least one virtual machine (VM) running on at least one processor, and/or the like configured to perform (e.g., collectively perform) any of the operations disclosed throughout. For example, the at least one processor 104 may include a CPU and a GPU configured to perform (e.g., collectively perform) any of the operations disclosed throughout. The processor 104 may be configured to run various software applications or computer code stored (e.g., maintained) in a non-transitory computer-readable medium (e.g., memory 106 and/or storage) and configured to execute various instructions or operations. For example, the processor 104 of the computing device 102 may be configured to: obtain training data; based at least on the training data, train a NN having classes, layers, and activation weights for the classes and layers, the classes including a given class, the layers including a given layer; calculate at least one average feature information (e.g., at least one average feature vector, at least one average topological persistence diagram, and/or at least one average histogram) associated with the trained NN, each of the at least one average feature information including a given average feature information (e.g., a given average feature vector, a given average topological persistence diagram, and/or a given average histogram) summarizing in-class statistics that each layer of the layers of the trained NN uses for the given class; and/or output, such as to the computing device 108, at least one of the trained NN and/or the at least one average feature information associated with the trained NN.

The at least one computing device 108 may be implemented as any suitable computing device. The at least one computing device 108 may include any or all of the elements, as shown in FIG. 1. For example, the computing device 108 may include at least one processor 110, at least one memory 112, and/or at least one storage, some or all of which may be communicatively coupled at any given time. For example, the at least one processor 110 may include at least one central processing unit (CPU), at least one graphics processing unit (GPU), at least one field-programmable gate array (FPGA), at least one application specific integrated circuit (ASIC), at least one digital signal processor, at least one data processing unit (DPU), at least one virtual machine (VM) running on at least one processor, and/or the like configured to perform (e.g., collectively perform) any of the operations disclosed throughout. For example, the at least one processor 110 may include a CPU and a GPU configured to perform (e.g., collectively perform) any of the operations disclosed throughout. The processor 110 may be configured to run various software applications or computer code stored (e.g., maintained) in a non-transitory computer-readable medium (e.g., memory 112 and/or storage) and configured to execute various instructions or operations. For example, the at least one processor 110 of the computing device 108 may be configured to: obtain test data (e.g., as sensor data from the at least one sensor system 122); recognize an incoming observation within the test data; obtain a trained neural network (NN) having classes, layers, and activation weights for the classes and layers, the classes including a given class, the layers including a given layer; obtain or calculate at least one average feature information associated with the trained NN, each of the at least one average feature information (e.g., at least one average feature vector, at least one average topological persistence diagram, and/or at least one average histogram) including a given average feature information (e.g., a given average feature vector, a given average topological persistence diagram, and/or a given average histogram) summarizing in-class statistics that each layer of the layers of the trained NN uses for the given class; receive an incoming observation (e.g., an incoming observation of test data) influencing the given layer; calculate a corresponding feature information (e.g., a corresponding feature vector, a corresponding topological persistence diagram, and/or a corresponding histogram) of the incoming observation, the corresponding feature information summarizing statistics of the incoming observation for the given layer; based at least on the trained NN, classify the incoming observation as being in the given class; for the incoming observation classified to be in the given class, calculate a distance score associated with a distance between the corresponding feature information of the incoming observation and the given average feature information; based at least on the calculated distance score, determine that the incoming observation is an out-of-distribution (OOD) sample; and/or upon a determination that the incoming observation is the OOD sample, at least one of output an alert indicating that the incoming observation is OOD or discard the classification of the incoming observation as being in the given class. In some embodiments, the at least one processor may be further configured to: use the trained NN to perform automatic target recognition (ATR), use the trained NN to perform a computer-vision-based autonomous landing, use the trained NN to perform computer-vision-based collision avoidance, use the trained NN to perform detection of activity of a person onboard a vehicle, and/or use the trained NN to perform computer-vision-based vehicle path planning.

The at least one display computing device 114 may be implemented as any suitable display computing device, such as a head-up display computing device, a head-down display computing device, a multi-function window (MFW) display computing device, or a head wearable display device. The at least one display computing device 114 may include any or all of the elements, as shown in FIG. 1. For example, the display computing device 114 may include at least one display 116, at least one processor 118, at least one memory 120, and/or at least one storage, some or all of which may be communicatively coupled at any given time. For example, the at least one processor 118 may include at least one central processing unit (CPU), at least one graphics processing unit (GPU), at least one field-programmable gate array (FPGA), at least one application specific integrated circuit (ASIC), at least one digital signal processor, at least one data processing unit (DPU), at least one virtual machine (VM) running on at least one processor, and/or the like configured to perform (e.g., collectively perform) any of the operations disclosed throughout. For example, the at least one processor 118 may include a CPU and a GPU configured to perform (e.g., collectively perform) any of the operations disclosed throughout. The at least one processor 118 may be configured to run various software applications or computer code stored (e.g., maintained) in a non-transitory computer-readable medium (e.g., memory 120 and/or storage) and configured to execute various instructions or operations. For example, the at least one processor 118 of the display computing device 114 may be configured to: an alert indicating that the incoming observation is OOD. For example, the display 116 may be configured to display the alert indicating that the incoming observation is OOD to a user.

The at least one sensor system 122 may be any suitable sensor system(s), such as at least one radar system, at least one light detection and ranging (LIDAR) system, and/or at least one camera system configured to, for example, capture images as sensor data of an environment. The at least one sensor system 122 may include any or all of the elements, as shown in FIG. 1. For example, the sensor system 122 may include at least one processor radar 124, at least one LIDAR 126, and/or at least one camera 128, some or all of which may be communicatively coupled at any given time. For example, the at least one sensor system 122 may be configured to: output test data as sensor data to the computing device 108.

In some embodiments, the distance is a one-dimensional Wasserstein distance between two probability mass functions associated with the given average feature information (e.g., a given average feature vector, a given average topological persistence diagram, or a given average histogram) and the corresponding feature information (e.g., a corresponding feature vector, a corresponding topological persistence diagram, or a corresponding histogram).

In some embodiments, the at least one processor 110 may be further configured to: based at least on the calculated distance score and a predetermined distance threshold, determine that the incoming observation is an out-of-distribution (OOD) sample.

In some embodiments, the at least one average feature information is at least one average feature vector, wherein the given average feature information is a given average feature vector, wherein the corresponding feature information is a corresponding feature vector.

In some embodiments, the at least one average feature information is at least one average topological persistence diagram, wherein the given average feature information is a given average topological persistence diagram, wherein the corresponding feature information is a corresponding topological persistence diagram. For example, the trained NN may be a trained convolutional neural network (CNN), wherein the layers are convolutional layers, wherein the given layer is a given convolutional layer, and the at least one processor may be further configured to: downsample rasterized inputs and rasterized outputs along at least one of (a) spatial coordinates of an image obtained from the given convolutional layer or (b) channels of the given convolutional layer to generate a bipartite graph. The bipartite graph may have the activation weights connecting the downsampled rasterized inputs to the downsampled rasterized outputs of the given layer, and the bipartite graph used for topological persistence diagram calculations.

In some embodiments, the at least one average feature information is at least one average histogram, wherein the given average feature information is a given average histogram, wherein the corresponding feature information is a corresponding histogram. For example, the given average histogram may be a histogram of the activation weights of the given layer and of the given class for training examples associated with the trained NN, and the given average histogram may approximate a probability distribution of the activation weights for the given class and the given layer. For example, the corresponding histogram may be a histogram of the statistics of the incoming observation for the given layer. For example, the distance is a one-dimensional Wasserstein distance between two probability mass functions associated with the given average histogram and the corresponding histogram.

Figure 2A:
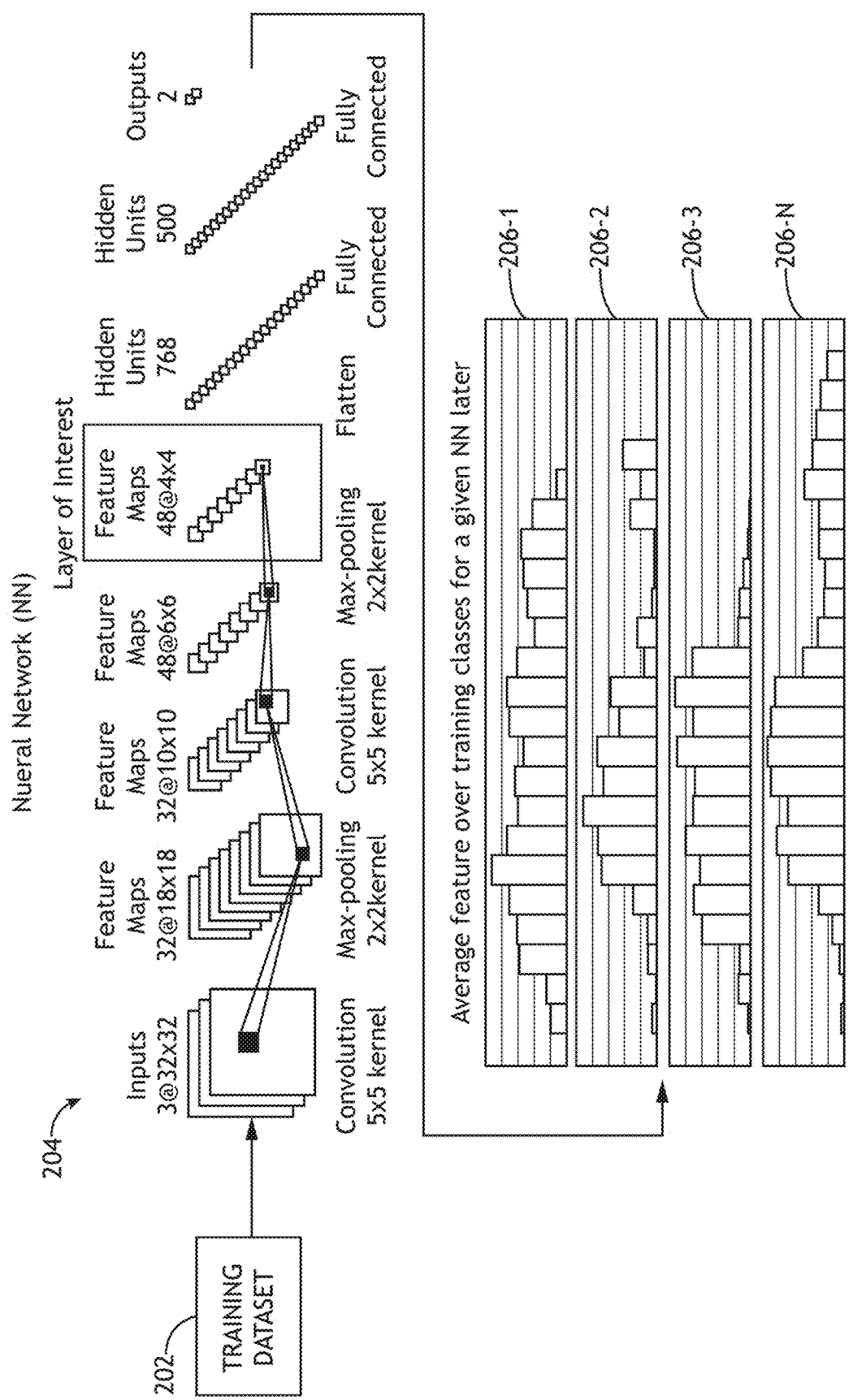
FIGS. 2A and 2B are diagrams associated with exemplary embodiments of training a NN and using the trained NN to determine an incoming observation to be an OOD sample during inference according to the inventive concepts disclosed herein.
Figure 2B:
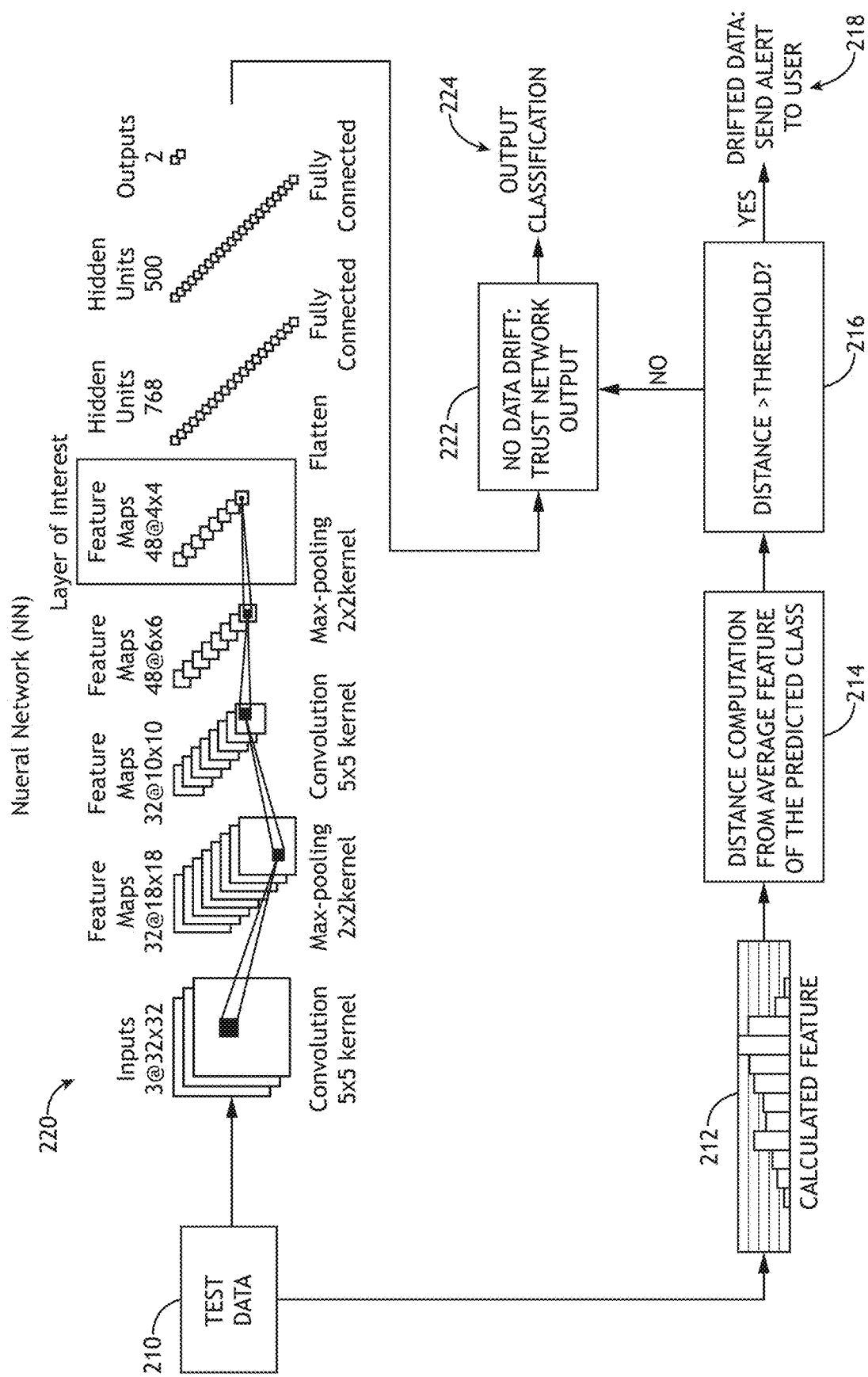

Referring now to FIGS. 2A and 2B, diagrams associated with exemplary embodiments of training a NN (as shown in FIG. 2A) and using the trained NN to determine an incoming observation to be an OOD sample during inference (as shown in FIG. 2B) according to the inventive concepts disclosed herein are depicted.

As exemplarily shown in FIG. 2A, the computing device 102 may be configured to use training data 202 to output (e.g., to the computing device 108) a trained NN 204 (e.g., a trained DNN and/or a trained CNN) and/or average feature information 206-1, 206-2, 206-3, . . . , 206-N (e.g., including a given average feature information (e.g., one of 206-1, 206-2, 206-3, . . . , or 206-N)). The trained NN 204 may have classes, layers, and activation weights for the classes and layers, wherein the classes including a given class, wherein the layers including a given layer. For example, the given average feature information may summarize in-class statistics that each layer of the layers of the trained NN 204 uses for the given class.

As exemplarily shown in FIG. 2B, the computing device 108 may be configured: obtain test data 210, which may include and/or be associated with an incoming observation influencing the given layer; calculate a corresponding feature information 212 of the incoming observation, the corresponding feature information summarizing statistics of the incoming observation for the given layer; perform a step 220 of, based at least on the trained NN, classify the incoming observation as being in the given class; perform a step 214 of, for the incoming observation classified to be in the given class, calculate a distance score associated with a distance between the corresponding feature information of the incoming observation and the given average feature information; perform a step 216 of, based at least on a comparison of the calculated distance score and a threshold, determine whether the incoming observation is an OOD sample; perform a step 218 of, if the incoming observation is an OOD sample, at least one of output an alert indicating that the incoming observation is OOD or discard the classification of the incoming observation as being in the given class; perform a step 222 of, if the incoming observation is not an OOD sample, trust the classification of the incoming observation as being in the given class; and/or perform a step 224 of outputting the classification of the incoming observation as being in the given class.

In some embodiments, the at least one average feature information is at least one average feature vector, the given average feature information is a given average feature vector, and the corresponding feature information is a corresponding feature vector. For example, the computing device 108 may have functionality of a data drift detection system by using a trained NN to alert a user when an incoming observation classification has drifted such that the incoming observation classification is identified as being OOD. In some embodiments, during the training phase (similar to as shown in FIG. 2A), an average feature vector is calculated for each of the training classes in the training dataset of the trained NN, which summarizes the average in-class statistics that a layer l of the trained NN uses in making decisions. A class-wise feature vector may be denoted as $\bar{\alpha}_{k,l}$ where k denotes the index of the training classes. $\bar{\alpha}_{k,l}$ is an average of the features $\alpha_l$ for the training examples belonging to class k. During the test phase (also referred to as inference) (similar as shown to FIG. 2B), for an incoming observation $x_0$, the corresponding feature vector $\alpha_l(x_0)$ may be computed for a layer l. For the given $x_0$, the NN may classify incoming observation $x_0$ into a class with label $k_0$. A score based on a distance metric d may be computed between (i) the calculated feature vector of the incoming observation and (ii) the average feature vector of class $k_0$. The score may be defined as $d(\alpha_l(x_0),\bar{\alpha}_{k0,l})$. Based on the value of the calculated score $d(\alpha_l(x_0),\bar{\alpha}_{k0,l})$, if it is greater than a pre-defined threshold, the computing device 108 may alert the user that the incoming observation is an OOD sample and that the NN prediction of the class label $k_0$ cannot be trusted with high confidence. If the score is lower than the threshold, there is no alert of data drift and the NN predictions may be trusted for the incoming observation.

Figure 3A:
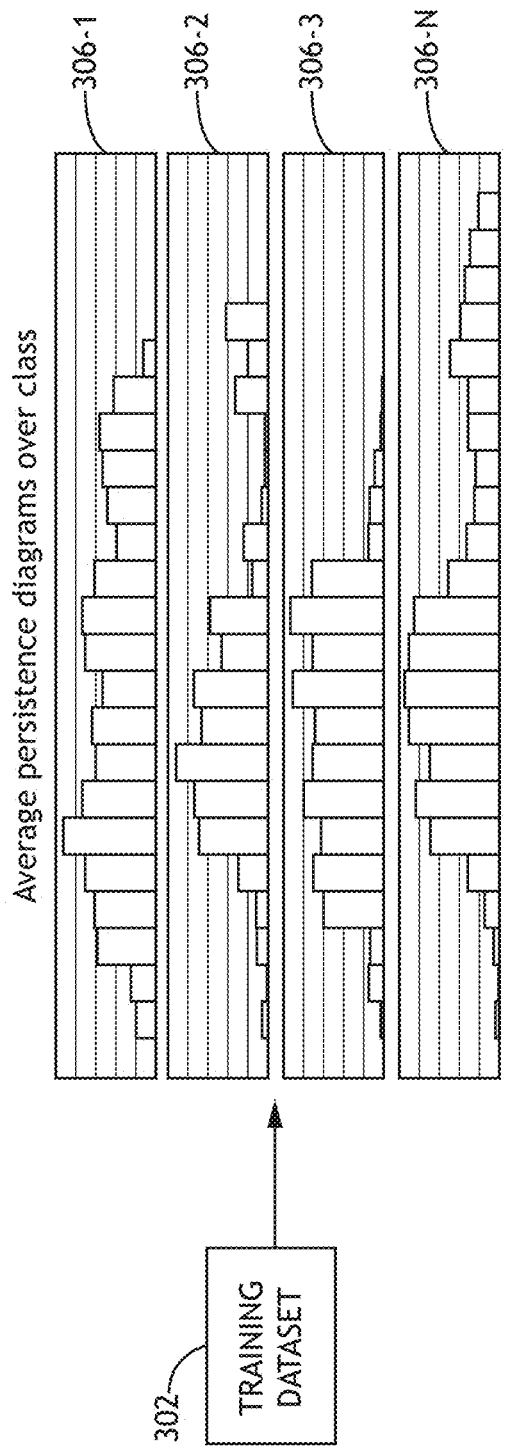
FIGS. 3A and 3B are diagrams associated with exemplary embodiments of training a NN and using the trained NN to determine an incoming observation to be an OOD sample during inference according to the inventive concepts disclosed herein.
Figure 3B:
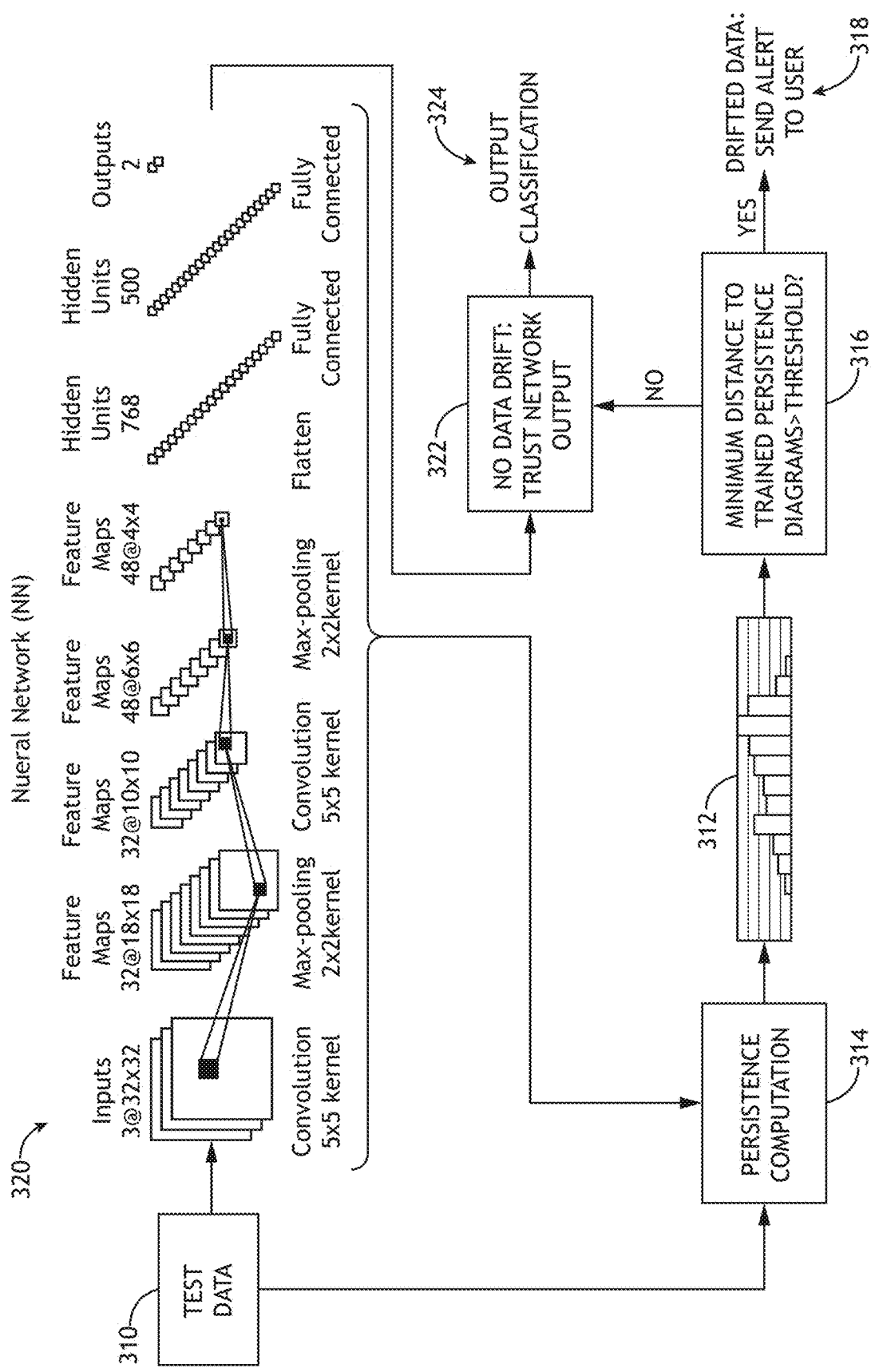

Referring now to FIGS. 3A and 3B, diagrams associated with exemplary embodiments of training a NN (as shown in FIG. 3A) and using the trained NN to determine an incoming observation to be an OOD sample during inference (as shown in FIG. 3B) according to the inventive concepts disclosed herein are depicted.

As exemplarily shown in FIG. 3A, the computing device 102 may be configured to use training data 302 (e.g., an ImageNet-O data set, which is a public benchmark data set for evaluation) to output (e.g., to the computing device 108) a trained NN (e.g., a trained DNN and/or a trained CNN (e.g., a trained VGG-16 CNN)) and/or average topological persistence diagram 306-1, 306-2, 306-3, . . . , 306-N (e.g., including a given average topological persistence diagram (e.g., one of 306-1, 306-2, 306-3, . . . , or 306-N)). The trained NN may have classes, layers, and activation weights for the classes and layers, wherein the classes including a given class, wherein the layers including a given layer. For example, the given average topological persistence diagram may summarize in-class statistics that each layer of the layers of the trained NN uses for the given class.

As exemplarily shown in FIG. 3B, the computing device 108 may be configured: obtain test data 310, which may include and/or be associated with an incoming observation influencing the given layer; calculate a corresponding topological persistence diagram 312 of the incoming observation, the corresponding topological persistence diagram summarizing statistics of the incoming observation for the given layer; perform a step 320 of, based at least on the trained NN, classify the incoming observation as being in the given class; perform a step 314 of, for the incoming observation classified to be in the given class, calculate a distance score associated with a distance between the corresponding topological persistence diagram of the incoming observation and the given topological persistence diagram; perform a step 316 of, based at least on a comparison of the calculated distance score and a threshold, determine whether the incoming observation is an OOD sample; perform a step 318 of, if the incoming observation is an OOD sample, at least one of output an alert indicating that the incoming observation is OOD or discard the classification of the incoming observation as being in the given class; perform a step 322 of, if the incoming observation is not an OOD sample, trust the classification of the incoming observation as being in the given class; and/or perform a step 324 of outputting the classification of the incoming observation as being in the given class.

Topological descriptors, such as persistence diagrams, have been found to be effective in improving OOD detection accuracy. When combined with traditional approaches such as latent and/or Bayesian uncertainties, topological uncertainty can improve OOD detection accuracy greater than what can be achieved by separate measures. However, the computation of persistence diagram is expensive (e.g., computationally, time, and/or power expensive), which currently serves as a computational bottleneck for extending such approaches to CNNs, which may be suited for modern computer-vision tasks, such as ATR. Hence, most state of the art (SoA) topological uncertainty (TU) calculations are based on fully-connected layers, and have not been extended to convolutional layers. Some embodiments include methodologies to accelerate TU calculations on convolutional layers; some embodiments may make TU usable for monitoring performance when under the influence of OOD data for deep CNNs, in practice.

Figure 4:
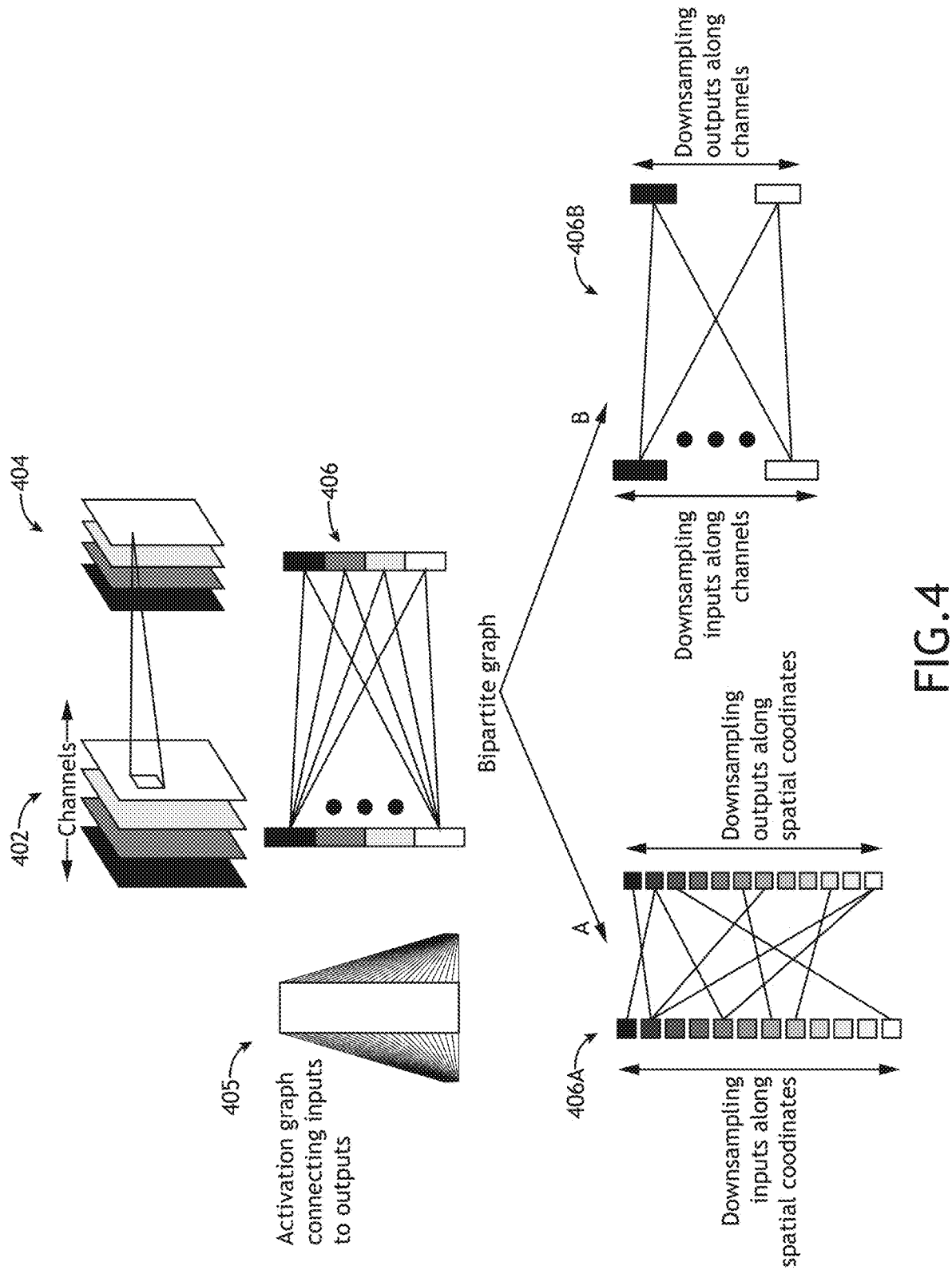
FIG. 4 is an exemplary flow diagram associated with exemplary embodiments using persistence diagrams according to the inventive concepts disclosed herein.

Referring now to FIG. 4, an exemplary flow diagram associated with exemplary embodiments using persistence diagrams according to the inventive concepts disclosed herein is depicted.

TU may be extended to convolutional layers by defining the graph that connects rasterized input/output representations.

FIG. 4 shows exemplary channels 402, exemplary rasterized inputs and rasterized outputs 404, an exemplary activation graph 405 connecting the inputs to the outputs, and exemplary bipartite graphs (e.g., 406, 406A, 406B). For example, to reduce the size of the bipartite graph 406 for persistence diagram calculations: (a) produce a bipartite graph 406A with rasterized inputs and rasterized outputs downsampled along spatial coordinates and/or (b) produce a bipartite graph 406B with rasterized inputs and rasterized outputs downsampled along channels. Downsampling may greatly reduce the number of edges of the activation graph for persistence diagram calculations. SoA TU calculations are currently based on fully connected layers, and some embodiments may extend use of TU to convolutional layers by making the calculations tractable to handle large activation graphs.

To computed topological uncertainty (TU) on convolutional layers of a neural network (NN), the input-output connectivity matrix of the layer may be represented as a bipartite graph 406. Then, to scale up the topological calculations, one or both of two different downsampling strategies may be employed to (a) produce a bipartite graph 406A with rasterized inputs and rasterized outputs downsampled along spatial coordinates and/or (b) produce a bipartite graph 406B with rasterized inputs and rasterized outputs downsampled along channels. This novel approach with respect to downsampling convolutional layers to reduce the dimensions of the bipartite graph 406 of activation weights connecting the inputs to the outputs of a layer may lead to faster computations of topological features due to reduced graph size.

For example, a convolutional layer can be denoted as the triplet (h, w, c), where (h,w) (e.g., spatial coordinates) indicates the height and the width of the image obtained from the layer, and where c denotes the number of channels in the layer.

The approach (a) can include downsampling along the spatial coordinates of the rasterized input-output representation of the convolutional layers. The OOD detection performance can be analyzed on a test case by varying the downsampling rate. For example, downsampling can lead to a trade-off in the computational cost and the OOD detection accuracy (e.g., as quantified by the area under ROC curve (AUC)). Any suitable downsampling rate can be selected that suits a desired speed-vs-performance tradeoff.

The approach (b) can include downsampling along the channel dimension of the rasterized input-output representation of the convolutional layers. The OOD detection performance can be analyzed on a test case by varying the downsampling rate. The downsampling can leads to a trade-off in the computational cost and the OOD detection accuracy (e.g., as quantified by the area under ROC curve (AUC)). Any suitable downsampling rate can be selected that suits a desired speed-vs-performance tradeoff.

Figure 5A:
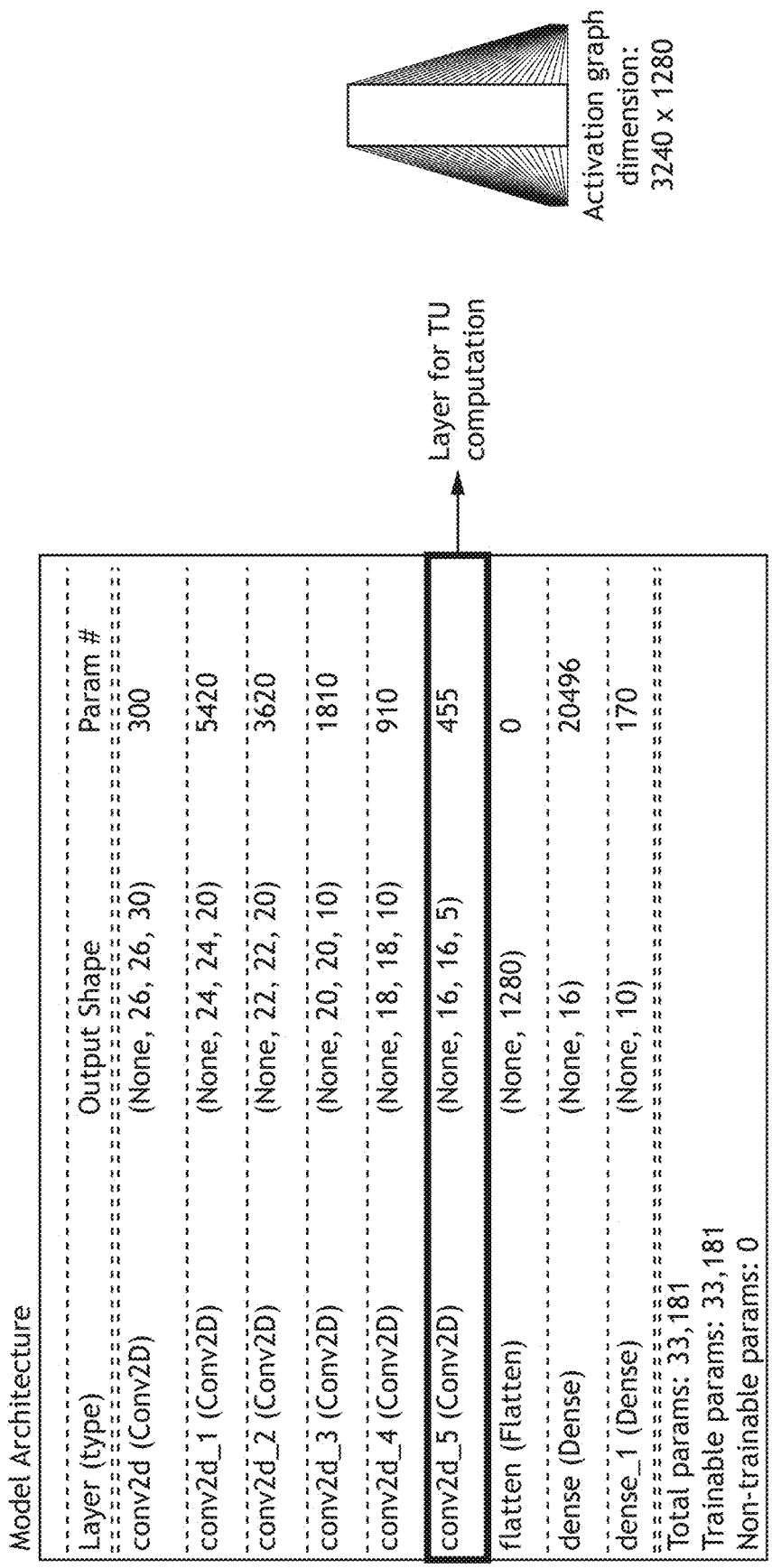
FIG. 5A shows an exemplary CNN model architecture with an activation graph associated with a layer for TU computation according to the inventive concepts disclosed herein.

Referring now to FIG. 5A, to illustrate advantages of downsampling along spatial coordinates, an exemplary CNN model architecture with an activation graph associated with a layer for TU computation according to the inventive concepts disclosed herein is depicted. For example, the exemplary CNN model architecture was selected to be a shallow CNN trained with ADAM (e.g., a type of optimization algorithm) on a Modified National Institute of Standards and Technology (MNIST) database (e.g., which is a database of handwritten digits from 0-9). The exemplary CNN model architecture was tested on in-distribution MNIST and out-of-distribution (OOD) Fashion MNIST dataset (FMINIST). As shown, the activation graph for the layer for TU computation has dimensions of 3240×1280.

Figure 5B:
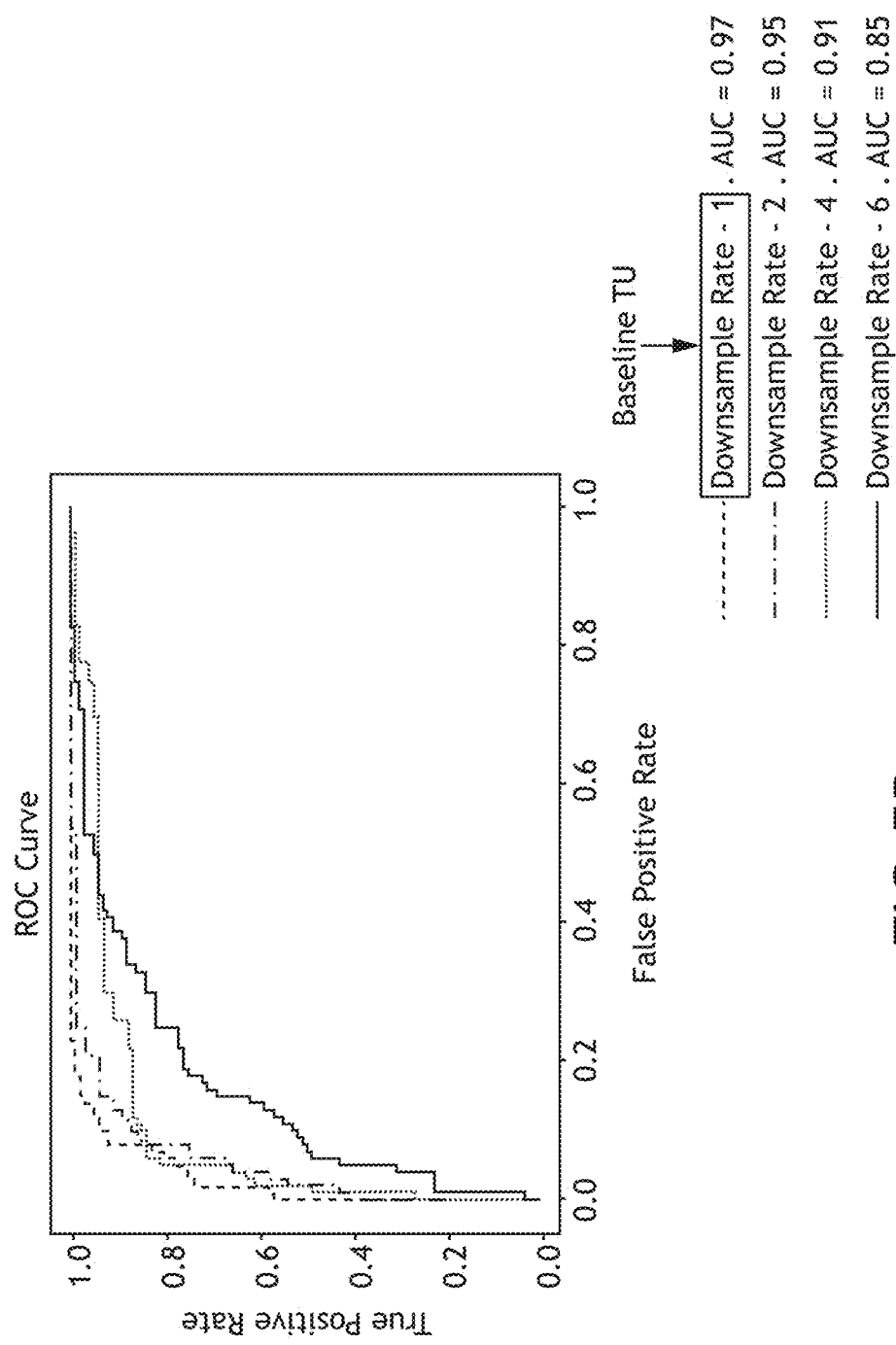
FIGS. 5B, 5C, and 5D are graphs showing advantages of downsampling along spatial coordinates for TU computations of the last convolutional layer of the exemplary CNN model architecture of FIG. 5A according to the inventive concepts disclosed herein.
Figure 5C:
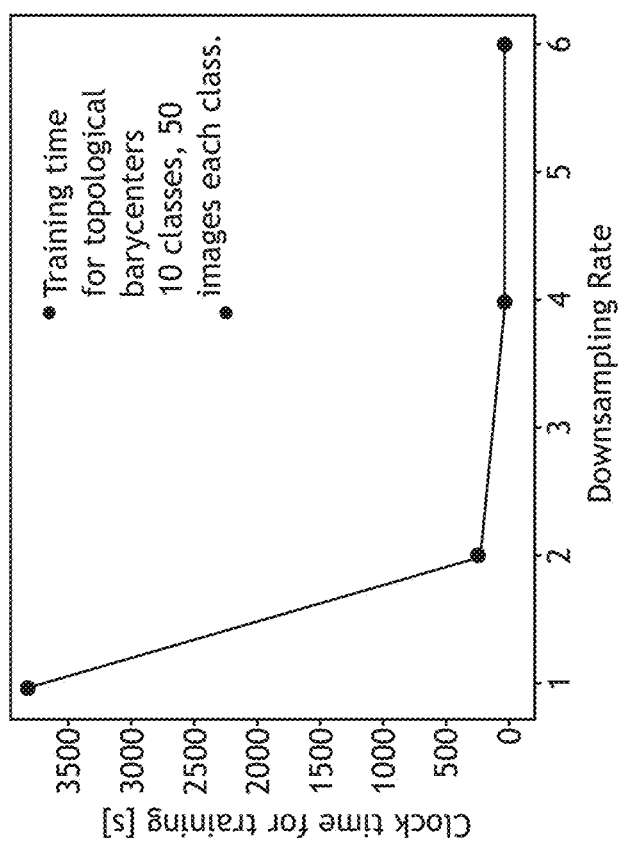
Figure 5D:
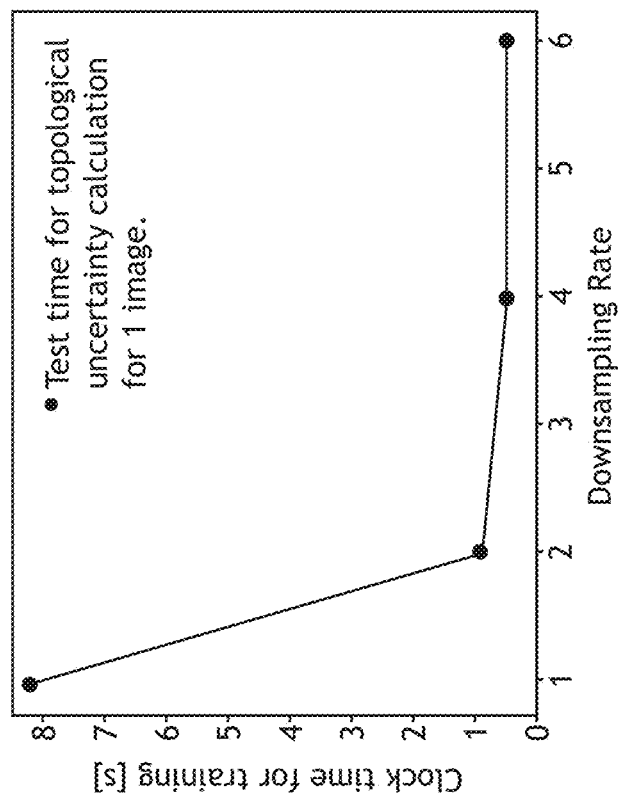

Referring now to FIGS. 5B, 5C, and 5D, graphs showing advantages of downsampling along spatial coordinates for TU computations of the last convolutional layer of the exemplary CNN model architecture of FIG. 5A according to the inventive concepts disclosed herein are depicted. Test results associated with TU were compared on the last convolutional layer for downsampling rates of 1 (i.e., a baseline TU computation with no downsampling), 2, 4, and 6. The baseline TU approach involves a TU computation over the complete activation graph. As shown in FIGS. 5B, 5C, and 5D, downsampling along spatial coordinates provides a significant tradeoff in computational cost. For example, a downsampling rate of 2 results in a 16× speed-up in training time and a 10× speedup in test-time implementation with a closely comparable classification performance (e.g., Area under ROC curve (AUC) of 0.95 vs 0.97). As tested, higher downsampling rates resulted in diminishing returns with respect to AUC vs computational cost tradeoff.

Figure 6A:
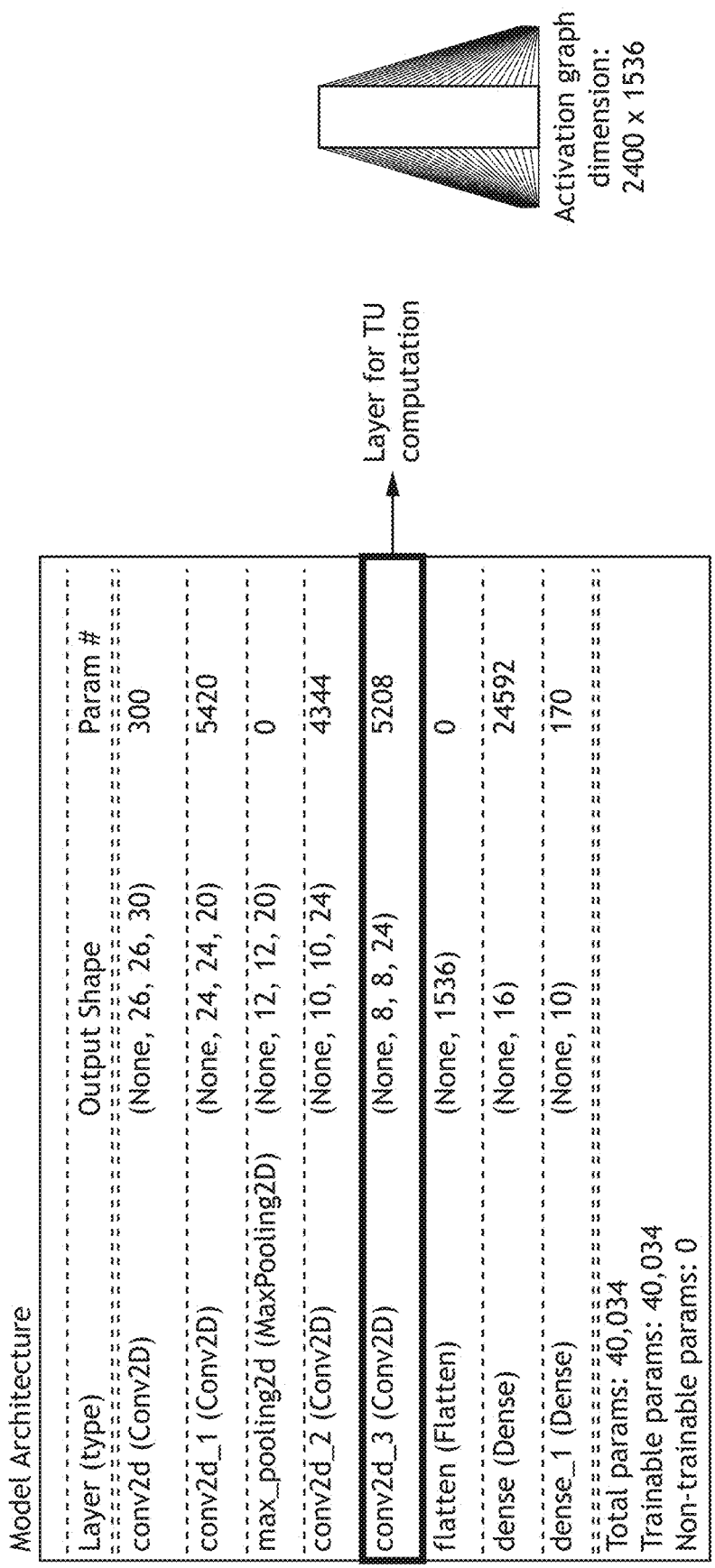
FIG. 6A shows an exemplary CNN model architecture with an activation graph associated with a layer for TU computation according to the inventive concepts disclosed herein.

Referring now to FIGS. 6A, to illustrate advantages of downsampling along channels, an exemplary CNN model architecture with an activation graph associated with a layer for TU computation according to the inventive concepts disclosed herein is depicted. For example, the exemplary CNN model architecture was selected to be a shallow CNN trained with ADAM on MNIST. The exemplary CNN model architecture was tested on in-distribution MNIST and out-of-distribution (OOD) Fashion MNIST dataset (FMINIST). As shown, the activation graph for the layer for TU computation has dimensions of 2400×1536.

Figure 6B:
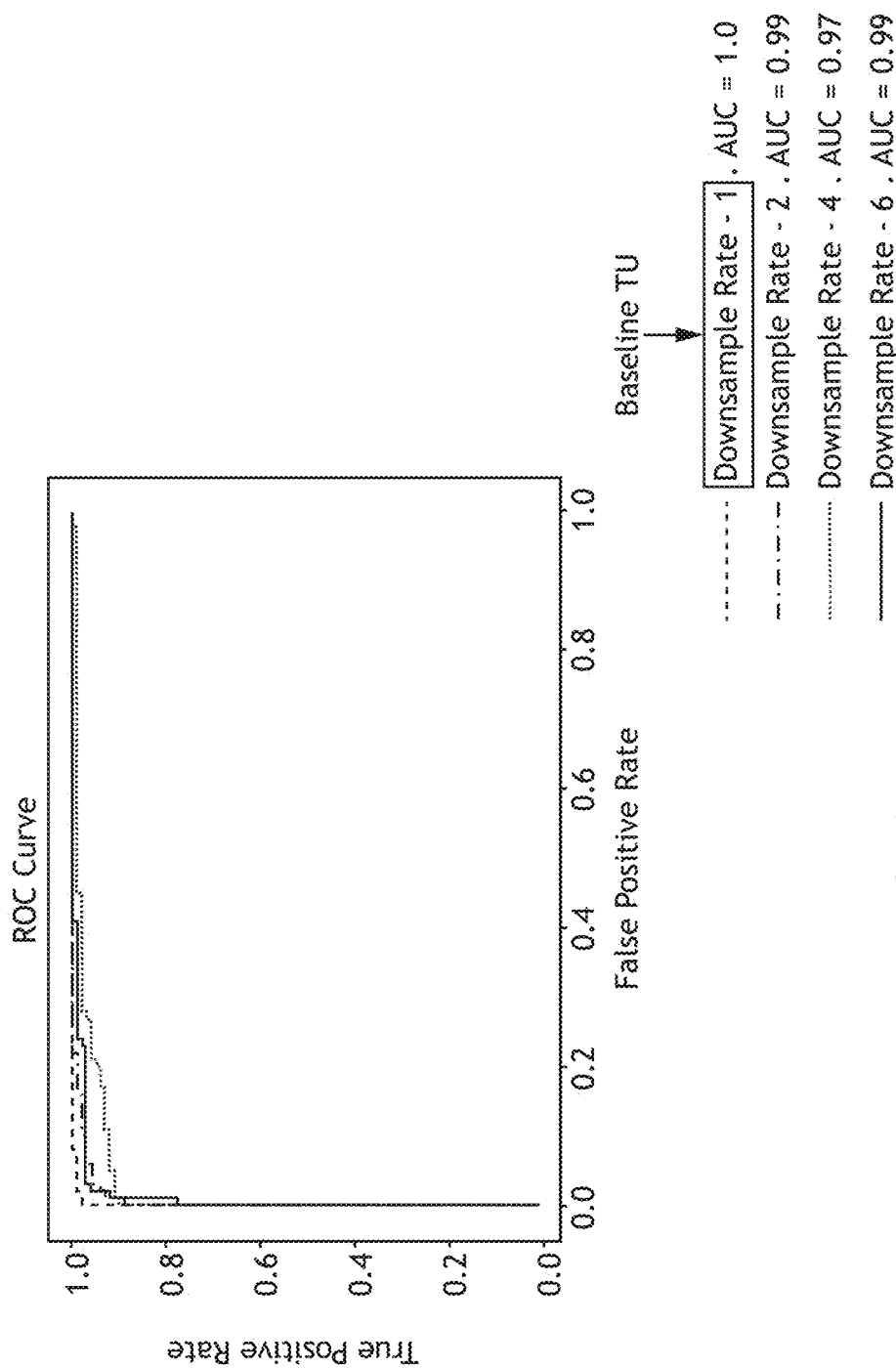
FIGS. 6B, 6C, and 6D are graphs showing advantages of downsampling along channels for TU computations of the last convolutional layer of the exemplary CNN model architecture of FIG. 6A according to the inventive concepts disclosed herein.
Figure 6C:
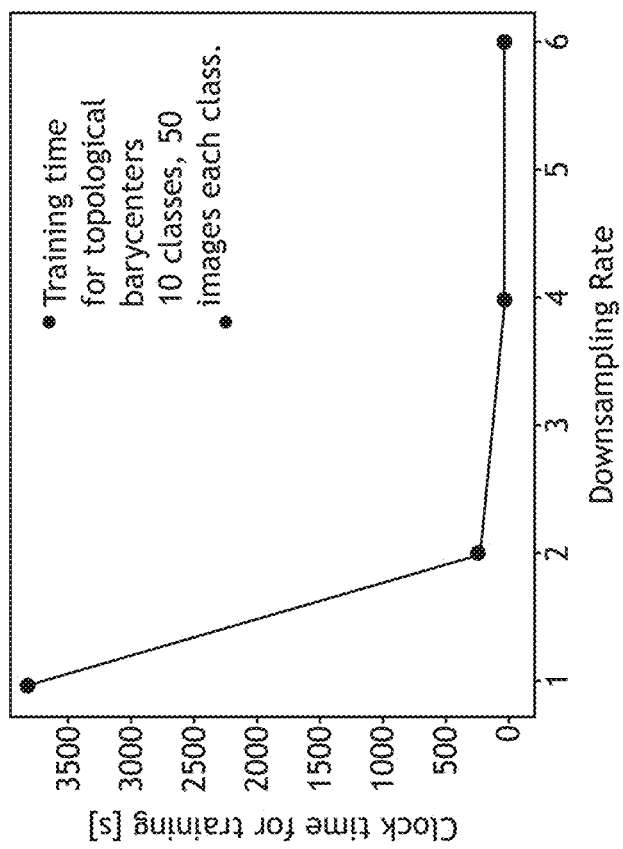
Figure 6D:
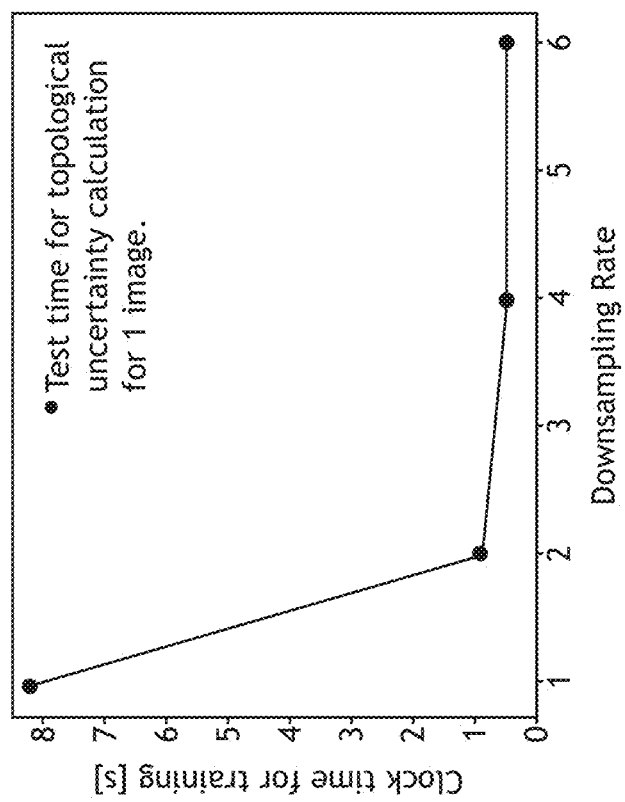

Referring now to FIGS. 6B, 6C, and 6D, graphs showing advantages of downsampling along channels for TU computations of the last convolutional layer of the exemplary CNN model architecture of FIG. 6A according to the inventive concepts disclosed herein are depicted. Test results associated with TU were compared on the last convolutional layer for downsampling rates of 1 (i.e., a baseline TU computation with no downsampling), 2, 4, and 6. The baseline TU approach involves a TU computation over the complete activation graph. As shown in FIGS. 6B, 6C, and 6D, downsampling along channels leads to significantly faster computations with little degradation in OOD detection. For example, a downsampling rate of rate of 6 results in 35× speed-up in training time and 15× speedup in test-time implementation with a closely comparable classification performance (Area under ROC curve (AUC) of 1 vs 0.99).

Referring generally now to FIGS. 7A, 7B, 7C, 7D, 7E, 8A, and 8B, exemplary embodiments using a system 100 configured to determine an incoming observation to be an OOD sample during NN inference by using histograms according to the inventive concepts disclosed herein are described and depicted.

Some embodiments may include calculating a feature vector of interest, which summarizes what a pre-trained NN has learned from the training data. A probability distribution of the activation weights for class k and the NN layer l may be considered as a feature of interest. A histogram of the weights of a NN layer under the influence of an incoming observation x may be denoted as $\bar{h}_{k,l}$, which may be calculated in the training phase. $\bar{h}_{k,l}$ denotes the average of the features $h_l$ for the training examples belonging to class k. $\bar{h}_{k,l}$ approximates the probability distribution of the activation weights for class k and the NN layer l. During a test phase (also referred to as inference), for an incoming observation $x_0$, predicted (e.g., classified by the trained NN) class label $k_0$ may be found, and a distance score $d(h_l(x_0), \bar{h}_{k,l})$ may be calculated, where the distance metric d may be chosen as the 1-D Wasserstein distance between two probability mass functions. Based on the value of the calculated distance score $d(h_l(x_0), \bar{h}_{k,l})$, if the distance score is greater than a pre-defined threshold, the computing device 108 may alert the user that the incoming observation is an OOD sample such that the NN prediction (e.g., classification) of the class label $k_0$ may not be trusted with high confidence. If the score is lower than the threshold, there may be no alert of data drift and the NN predictions may be trusted. This histogram approach is different from calculating the topological features. In some embodiments, the histogram approach may be significantly faster than calculating the topological features and can potentially perform better than the topological approach.

Referring now to FIG. 7A, to illustrate advantages of using histograms, an exemplary CNN model architecture with an activation graph associated with a layer for histogram computation according to the inventive concepts disclosed herein is depicted. For example, the exemplary CNN model architecture was selected to be a CNN trained with ADAM on MNIST. The exemplary CNN model architecture was tested on in-distribution MNIST and out-of-distribution (OOD) Fashion MNIST dataset (FMINIST).

Figure 7B:
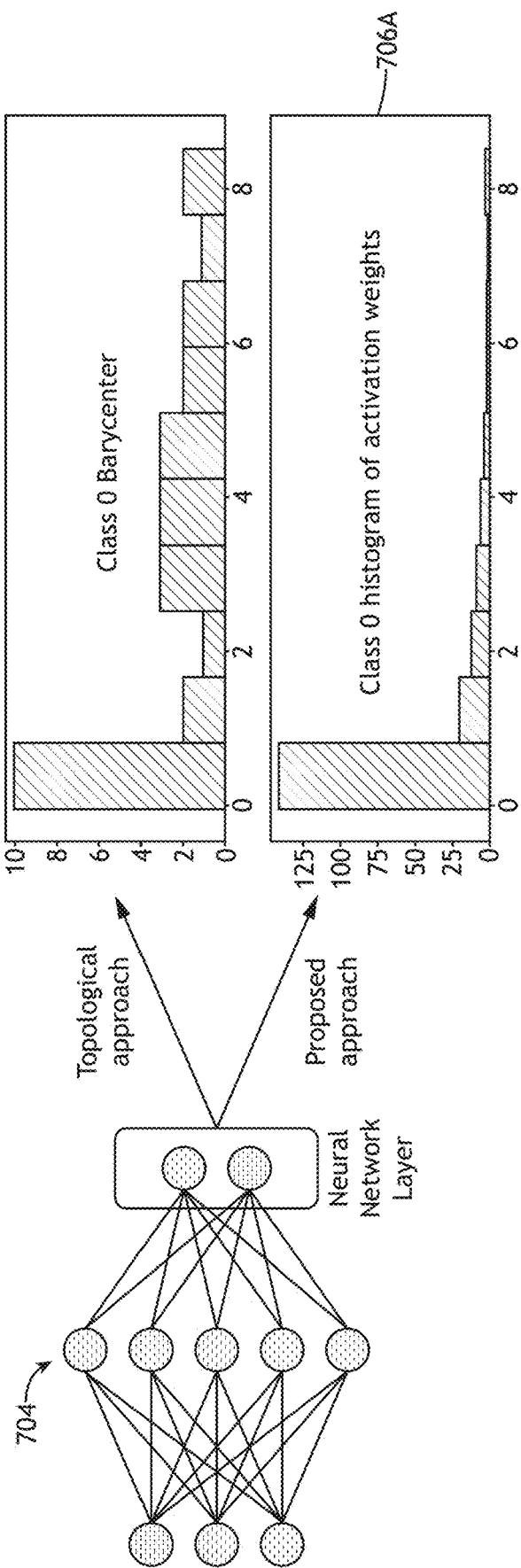
FIG. 7B shows an exemplary trained CNN associated with a layer for histogram computations as compared to a topological computation according to the inventive concepts disclosed herein.

Referring now to FIG. 7B, an exemplary trained CNN 704 associated with a layer for histogram computations as compared to a topological computation according to the inventive concepts disclosed herein is depicted. An example of a given average histogram (e.g., 706-N) (e.g., calculated using the histogram approach) of activation weights as compared to an example of a given average persistence diagram (e.g., calculated using the topological approach) are also shown. Calculating the persistence diagrams can be computationally expensive. Persistence diagrams result in a probability distribution over a subset of the activation weights. Whereas, the histogram approach considers the probability distribution of all of the activation weights of the NN layer, approximated by histograms, which may be significantly faster than the persistence diagram-based computations.

Figure 7C:
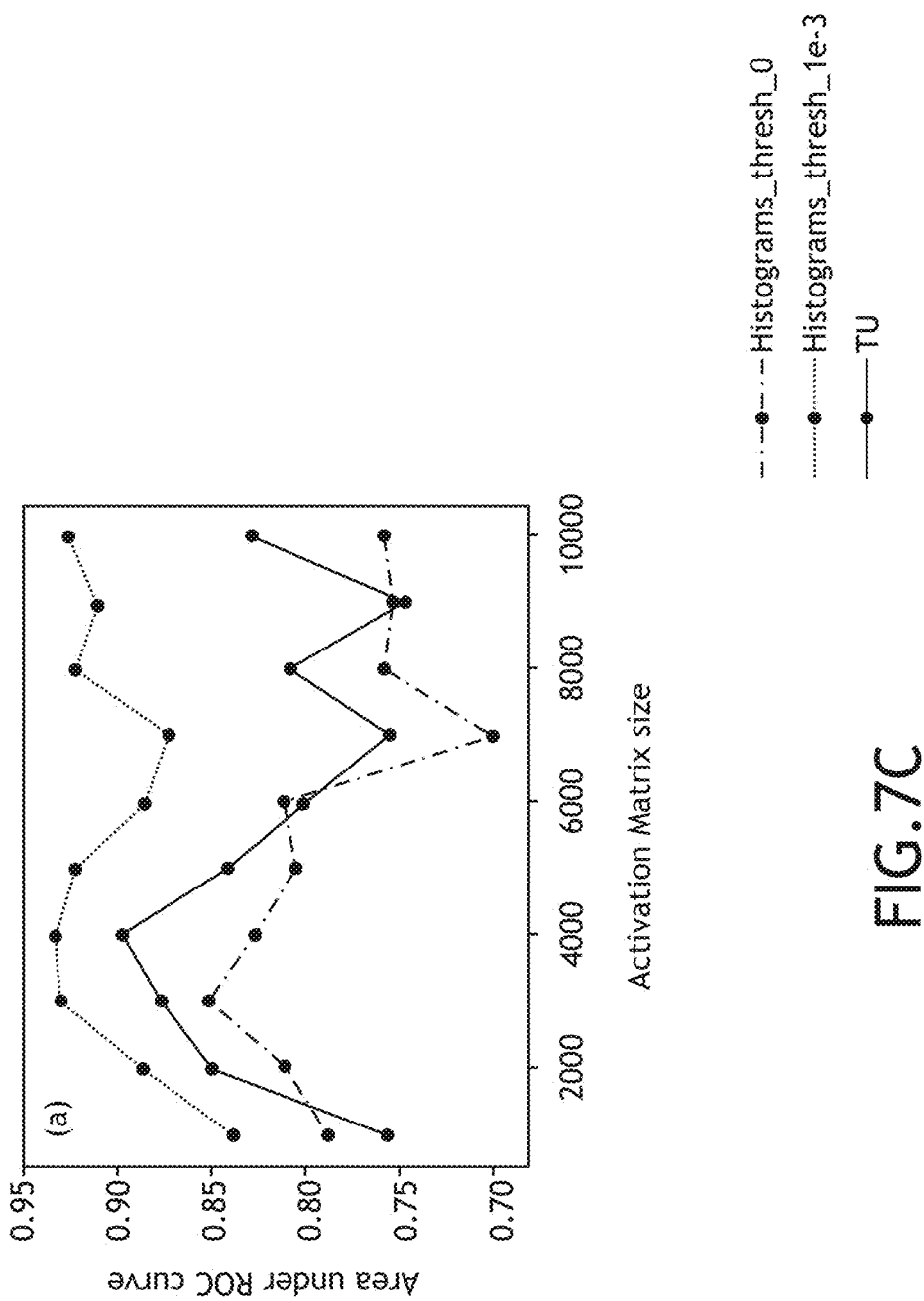
FIGS. 7C, 7D, and 7E are graphs showing advantages of using the histogram approach as compared to TU computations for the last convolutional layer of the exemplary CNN model architecture of FIG. 7A according to the inventive concepts disclosed herein.
Figure 7D:
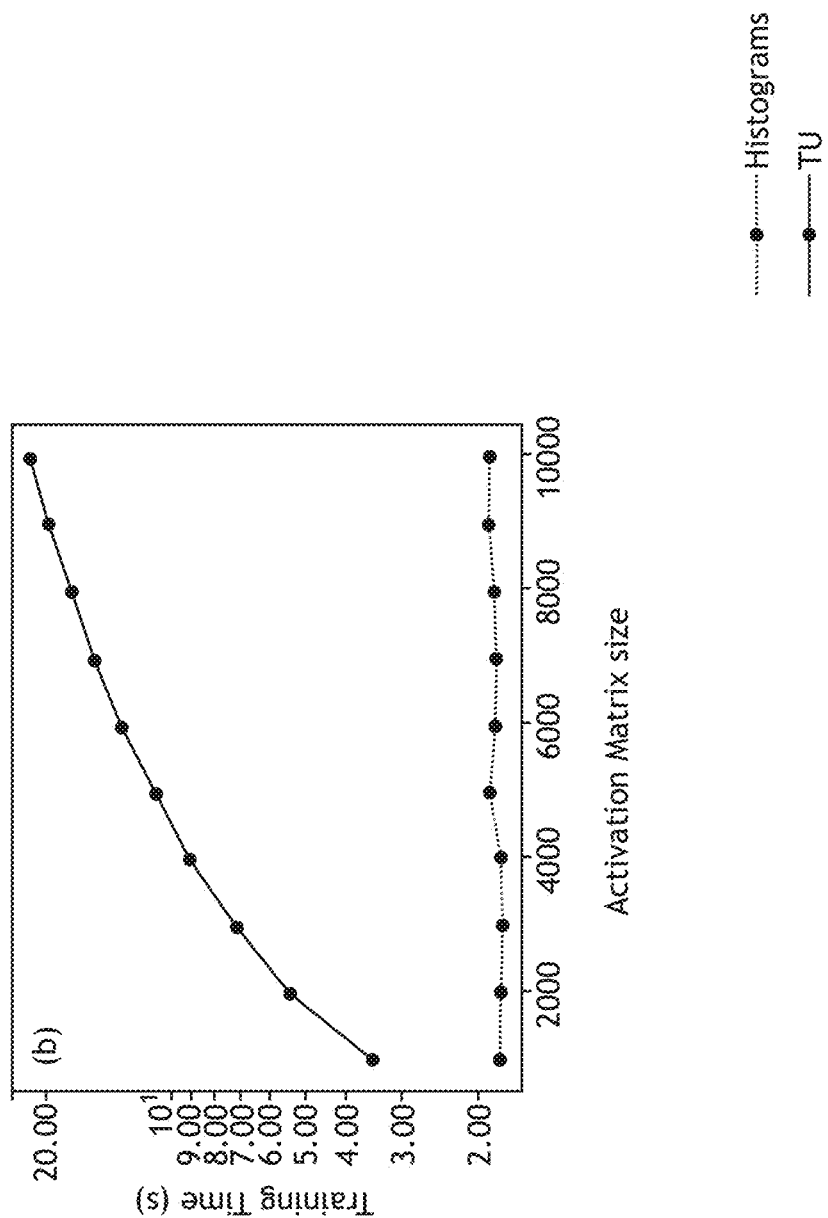
Figure 7E:
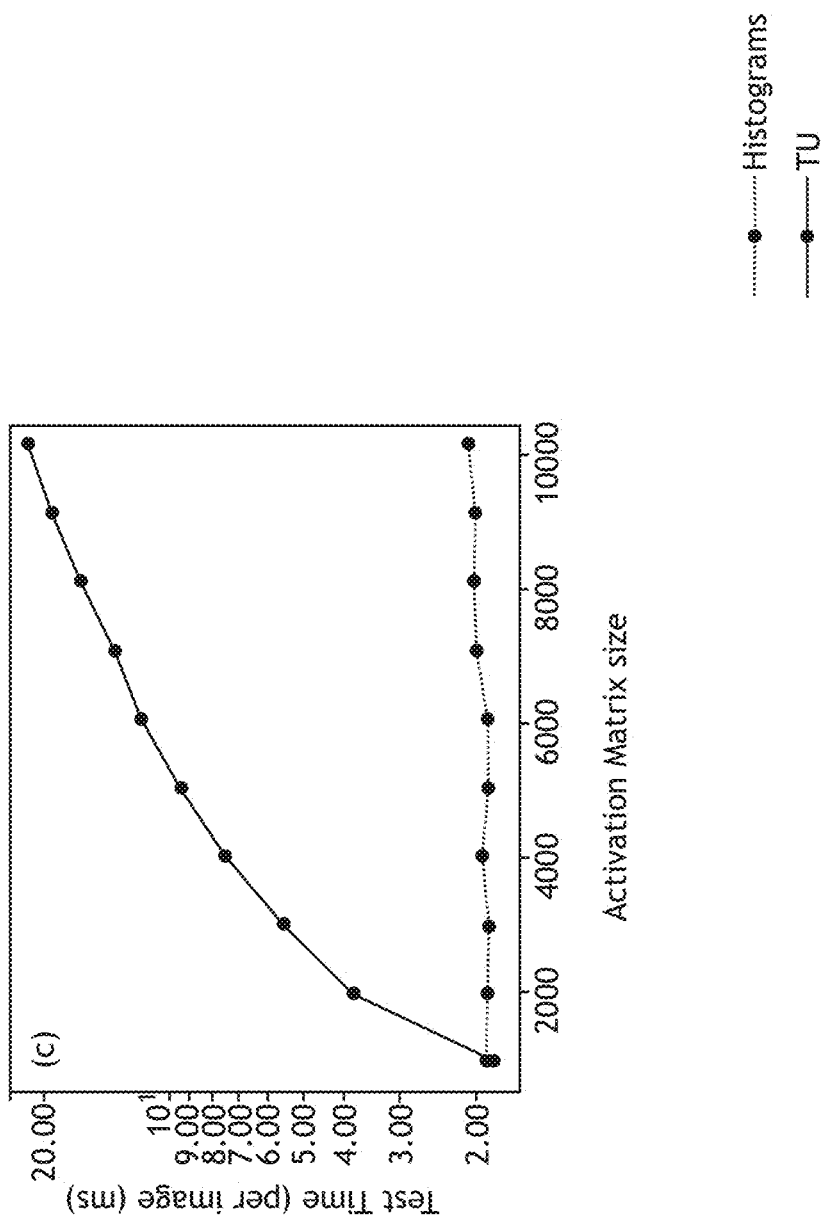

Referring now to FIGS. 7C, 7D, and 7E, graphs showing advantages of using the histogram approach as compared to TU computations for the last convolutional layer of the exemplary CNN model architecture of FIG. 7A according to the inventive concepts disclosed herein are depicted. The baseline TU approach involves a TU computation over the complete activation graph.

As shown in FIGS. 7C, 7D, and 7E, activation matrix size indicates the size of the input-output connectivity matrix for edge weights of the neural network layer. An ablation study with activation matrix size up to $\mathcal{O}(10^4)$ indicates that the proposed histogram approach can accelerate the training and inference time required by at least 10×. For real world CNNs used in ATR, when considering convolutional layers, the activation matrix size can be $\sim\mathcal{O}(10^6)$ to $\mathcal{O}(10^{10})$. In such situations, the expected speed up may be at least 40-50×. For example, a 50× speed-up was found in the test-phase by using this approach on the last dense layer of MobineNetV2 having an activation matrix size of $1.28\times10^6$, trained on Imagenet-1k (in-distribution). For example, with an appropriate choice of binning in approximating the probability distribution in histograms, it is possible to have better performance than the topological approach (as shown in the top curve in FIG. 7C).

Figure 8A:
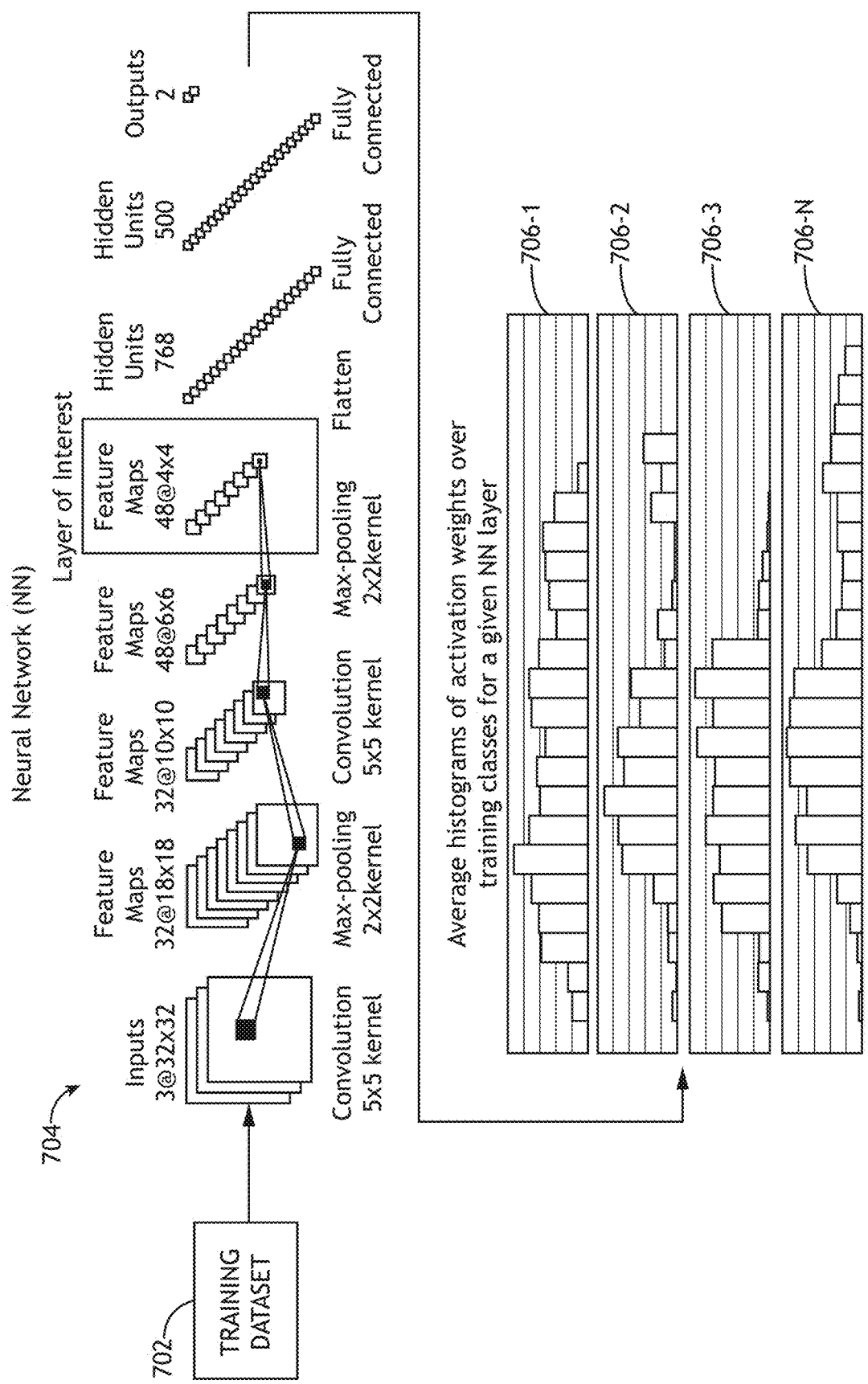
FIGS. 8A and 8B are diagrams associated with exemplary embodiments of training a NN and using the trained NN to determine an incoming observation to be an OOD sample during inference according to the inventive concepts disclosed herein.
Figure 8B:
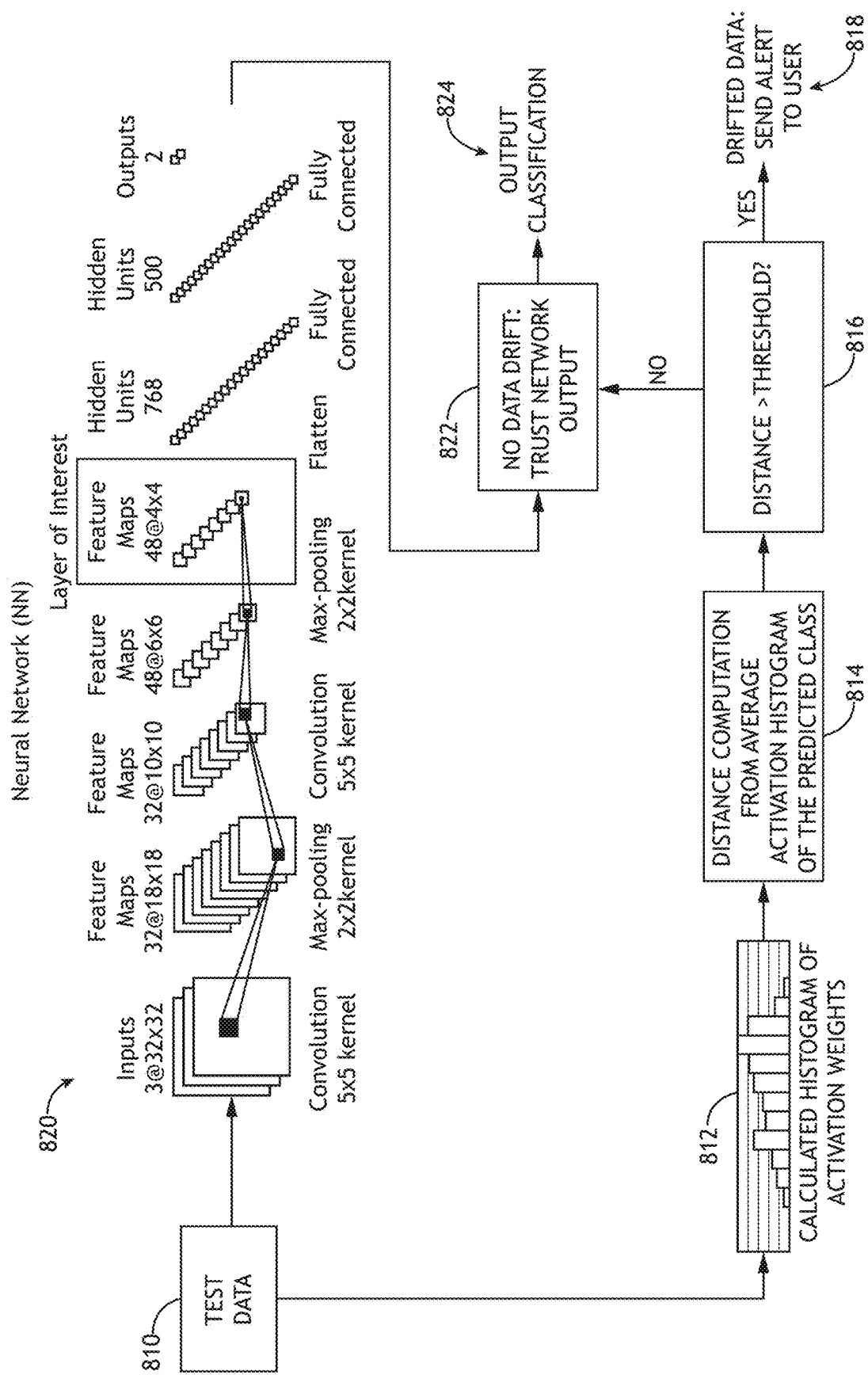

Referring now to FIGS. 8A and 8B, diagrams associated with exemplary embodiments of training a NN (as shown in FIG. 8A) and using the trained NN to determine an incoming observation to be an OOD sample during inference (as shown in FIG. 8B) according to the inventive concepts disclosed herein are depicted.

As exemplarily shown in FIG. 8A, the computing device 102 may be configured to use training data 702 (e.g., a training set) to output (e.g., to the computing device 108) a trained NN 704 (e.g., a trained DNN and/or a trained CNN) and/or average histograms 706-1, 706-2, 706-3, ..., 706-N (e.g., including a given average histogram (e.g., one of 706-1, 706-2, 706-3, ..., or 706-N)). The trained NN 704 may have classes, layers, and activation weights for the classes and layers, wherein the classes including a given class, wherein the layers including a given layer. For example, the given average histogram may approximate a probability distribution of the activation weights for the given class and the given layer.

As exemplarily shown in FIG. 8B, the computing device 108 may be configured: obtain test data 810, which may include and/or be associated with an incoming observation influencing the given layer; calculate a corresponding histogram 812 of the incoming observation, the corresponding histogram summarizing statistics of the incoming observation for the given layer; perform a step 820 of, based at least on the trained NN, classify the incoming observation as being in the given class; perform a step 814 of, for the incoming observation classified to be in the given class, calculate a distance score associated with a distance between the corresponding histogram of the incoming observation and the given average histogram; perform a step 816 of, based at least on a comparison of the calculated distance score and a threshold, determine whether the incoming observation is an OOD sample; perform a step 818 of, if the incoming observation is an OOD sample, at least one of output an alert indicating that the incoming observation is OOD or discard the classification of the incoming observation as being in the given class; perform a step 822 of, if the incoming observation is not an OOD sample, trust the classification of the incoming observation as being in the given class; and/or perform a step 824 of outputting the classification of the incoming observation as being in the given class.

Figure 9:
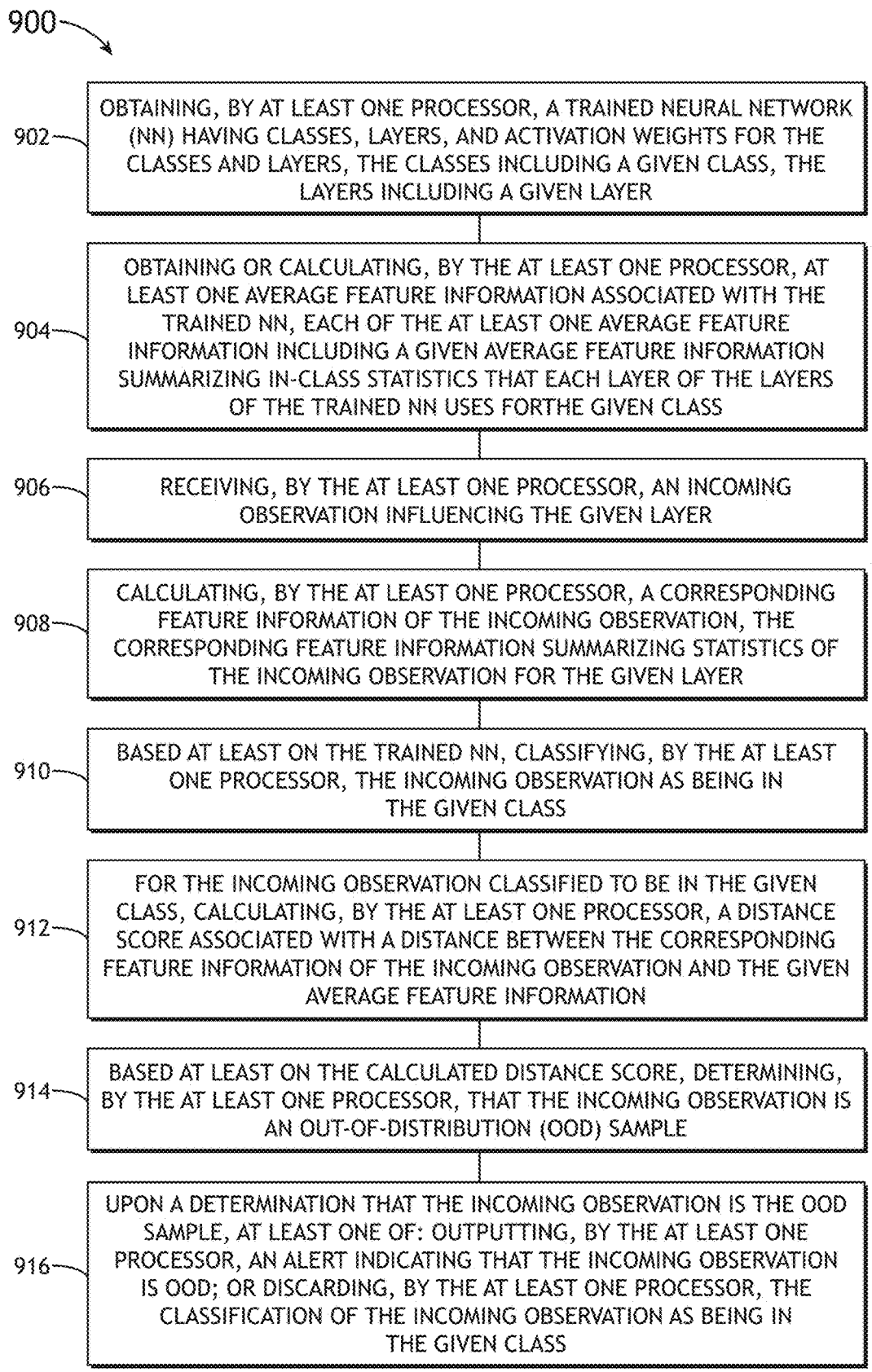
FIG. 9 is a diagram of an exemplary embodiment of a method according to the inventive concepts disclosed herein.

Referring now to FIG. 9, an exemplary embodiment of a method 900 according to the inventive concepts disclosed herein may include one or more of the following steps. Additionally, for example, some embodiments may include performing one or more instances of the method 900 iteratively, concurrently, and/or sequentially. Additionally, for example, at least some of the steps of the method 900 may be performed in parallel, iteratively, and/or concurrently. Additionally, in some embodiments, at least some of the steps of the method 900 may be performed non-sequentially.

A step 902 may include obtaining, by at least one processor, a trained neural network (NN) having classes, layers, and activation weights for the classes and layers, the classes including a given class, the layers including a given layer.

A step 904 may include obtaining or calculating, by the at least one processor, at least one average feature information associated with the trained NN, each of the at least one average feature information including a given average feature information summarizing in-class statistics that each layer of the layers of the trained NN uses for the given class.

A step 906 may include receiving, by the at least one processor, an incoming observation influencing the given layer.

A step 908 may include calculating, by the at least one processor, a corresponding feature information of the incoming observation, the corresponding feature information summarizing statistics of the incoming observation for the given layer.

A step 910 may include based at least on the trained NN, classifying, by the at least one processor, the incoming observation as being in the given class.

A step 912 may include for the incoming observation classified to be in the given class, calculating, by the at least one processor, a distance score associated with a distance between the corresponding feature information of the incoming observation and the given average feature information.

A step 914 may include based at least on the calculated distance score, determining, by the at least one processor, that the incoming observation is an out-of-distribution (OOD) sample.

A step 916 may include upon a determination that the incoming observation is the OOD sample, at least one of: outputting, by the at least one processor, an alert indicating that the incoming observation is OOD; or discarding, by the at least one processor, the classification of the incoming observation as being in the given class.

Further, the method 900 may include any of the operations disclosed throughout.

Referring generally again to FIGS. 1-9, as will be appreciated from the above, embodiments of the inventive concepts disclosed herein may be directed to a system and a method configured to determine an incoming observation to be an OOD sample during NN (e.g., DNN and/or CNN) inference.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
at least one processor configured to:
obtain a trained neural network (NN) having classes, layers, and activation weights for the classes and layers, the classes including a given class, the layers including a given layer;
obtain or calculate at least one average feature information associated with the trained NN, each of the at least one average feature information including a given average feature information summarizing in-class statistics that each layer of the layers of the trained NN uses for the given class, wherein the at least one average feature information is at least one average topological persistence diagram, wherein the given average feature information is a given average topological persistence diagram;
receive an incoming observation influencing the given layer;
calculate a corresponding feature information of the incoming observation, the corresponding feature information summarizing statistics of the incoming observation for the given layer, wherein the corresponding feature information is a corresponding topological persistence diagram;
based at least on the trained NN, classify the incoming observation as being in the given class;
for the incoming observation classified to be in the given class, calculate a distance score associated with a distance between the corresponding feature information of the incoming observation and the given average feature information;

based at least on the calculated distance score, determine that the incoming observation is an out-of-distribution (OOD) sample; and upon a determination that the incoming observation is the OOD sample, at least one of output an alert indicating that the incoming observation is OOD or discard the classification of the incoming observation as being in the given class.

2. The system of claim 1, wherein the trained NN is a trained convolutional neural network (CNN), wherein the layers are convolutional layers, the given layer is a given convolutional layer, wherein the at least one processor is further configured to: downsample rasterized inputs and rasterized outputs along at least one of (a) spatial coordinates of an image obtained from the given convolutional layer or (b) channels of the given convolutional layer to generate a bipartite graph, the bipartite graph having the activation weights connecting the downsampled rasterized inputs to the downsampled rasterized outputs of the given layer, the bipartite graph used for topological persistence diagram calculations.

3. The system of claim 2, wherein the at least one processor is further configured to: downsample the rasterized inputs and the rasterized outputs along the spatial coordinates of the image obtained from the given convolutional layer.

4. The system of claim 2, wherein the at least one processor is further configured to: downsample the rasterized inputs and the rasterized outputs along the channels of the given convolutional layer.

5. The system of claim 2, wherein the at least one processor is further configured to: downsample the rasterized inputs and the rasterized outputs along the spatial coordinates of the image obtained from the given convolutional layer and along the channels of the given convolutional layer.

6. The system of claim 1, wherein the trained NN is at least one of a trained deep neural network (DNN) or a trained convolutional neural network (CNN).

7. The system of claim 1, wherein the at least one processor is further configured to: based at least on the calculated distance score and a predetermined distance threshold, determine that the incoming observation is an out-of-distribution (OOD) sample.

8. The system of claim 1, wherein the at least one processor is further configured to: upon the determination that the incoming observation is the OOD sample, output the alert indicating that the incoming observation is OOD.

9. The system of claim 1, wherein the at least one processor is further configured to: upon the determination that the incoming observation is the OOD sample, discard the classification of the incoming observation as being in the given class.

10. The system of claim 1, wherein the at least one processor is further configured to: use the trained NN to perform automatic target recognition (ATR).

11. The system of claim 1, wherein the at least one processor is further configured to at least one of: use the trained NN to perform a computer-vision-based autonomous landing; use the trained NN to perform computer-vision-based collision avoidance; use the trained NN to perform detection of activity of a person onboard a vehicle; or use the trained NN to perform computer-vision-based vehicle path planning.

12. The system of claim 1, wherein the system is a vehicle.

13. A method, comprising:

obtaining, by at least one processor, a trained neural network (NN) having classes, layers, and activation weights for the classes and layers, the classes including a given class, the layers including a given layer;

obtaining or calculating, by the at least one processor, at least one average feature information associated with the trained NN, each of the at least one average feature information including a given average feature information summarizing in-class statistics that each layer of the layers of the trained NN uses for the given class, wherein the at least one average feature information is at least one average topological persistence diagram, wherein the given average feature information is a given average topological persistence diagram;

receiving, by the at least one processor, an incoming observation influencing the given layer;

calculating, by the at least one processor, a corresponding feature information of the incoming observation, the corresponding feature information summarizing statistics of the incoming observation for the given layer, wherein the corresponding feature information is a corresponding topological persistence diagram;

based at least on the trained NN, classifying, by the at least one processor, the incoming observation as being in the given class;

for the incoming observation classified to be in the given class, calculating, by the at least one processor, a distance score associated with a distance between the corresponding feature information of the incoming observation and the given average feature information;

based at least on the calculated distance score, determining, by the at least one processor, that the incoming observation is an out-of-distribution (OOD) sample; and upon a determination that the incoming observation is the OOD sample, at least one of: outputting, by the at least one processor, an alert indicating that the incoming observation is OOD; or discarding, by the at least one processor, the classification of the incoming observation as being in the given class.

14. The method of claim 13, wherein the trained NN is a trained convolutional neural network (CNN), wherein the layers are convolutional layers, the given layer is a given convolutional layer, wherein the method further comprises: downsampling, by the at least one processor, rasterized inputs and rasterized outputs along at least one of (a) spatial coordinates of an image obtained from the given convolutional layer or (b) channels of the given convolutional layer to generate a bipartite graph, the bipartite graph having the activation weights connecting the downsampled rasterized inputs to the downsampled rasterized outputs of the given layer, the bipartite graph used for topological persistence diagram calculations.

15. The system of claim 1, wherein the at least one processor is at least two processors.

* * * * *